(12) United States Patent
Castellanos Zamora et al.

(10) Patent No.: US 10,880,726 B2
(45) Date of Patent: Dec. 29, 2020

(54) METHODS AND APPARATUSES FOR HANDLING SLICE SELECTION DATA FOR A USER

(71) Applicant: Telefonaktiebolaget LM Ericsson (publ), Stockholm (SE)

(72) Inventors: David Castellanos Zamora, Madrid (ES); Antonio Alonso Alarcon, Madrid (ES); Maria Esther Bas Sanchez, Madrid (ES); Trinidad Castillo Casero, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/484,384

(22) PCT Filed: Feb. 24, 2017

(86) PCT No.: PCT/EP2017/054294
§ 371 (c)(1),
(2) Date: Aug. 7, 2019

(87) PCT Pub. No.: WO2018/153470
PCT Pub. Date: Aug. 30, 2018

(65) Prior Publication Data
US 2020/0008047 A1 Jan. 2, 2020

(51) Int. Cl.
*H04W 8/20* (2009.01)
*H04W 8/04* (2009.01)
(Continued)

(52) U.S. Cl.
CPC .............. *H04W 8/20* (2013.01); *H04W 8/04* (2013.01); *H04W 48/18* (2013.01); *H04W 60/04* (2013.01)

(58) Field of Classification Search
CPC ......... H04W 8/04; H04W 8/20; H04W 48/18; H04W 60/04
See application file for complete search history.

(56) References Cited

U.S. PATENT DOCUMENTS

2016/0353367 A1  12/2016  Vrzic et al.
2020/0053083 A1* 2/2020  Kunz ................ H04W 4/50
(Continued)

FOREIGN PATENT DOCUMENTS

WO   2015182111 A1   12/2015

OTHER PUBLICATIONS

International Search Report and Written Opinion dated Nov. 6, 2017 for International Application No. PCT/EP2017/054294 filed on Feb. 24, 2017, consisting of 14-pages.
(Continued)

*Primary Examiner* — Wayne H Cai
(74) *Attorney, Agent, or Firm* — Patent Portfolio Builders, PLLC

(57) ABSTRACT

The present invention faces the issue of improving isolation of network slices in network slicing deployments where a centralized User Data Management, which includes subscription information for all users in a network with a plurality of network slices, is shared by the plurality of network slices. To solve this issue, the present invention provides for a distributed slice data repository for handling slice selection data for users equipped with a user equipment, UE, in a network that includes a plurality of network slices. This distributed slice data repository has: a slice user data repository, SDR, per network slice basis and including subscription information for each UE to be served by the network slice, and a slice selection repository, SSR, which
(Continued)

is external to any network slice, shared by the plurality of network slices, and only includes slice selection data for every UE in the network.

21 Claims, 17 Drawing Sheets

(51) Int. Cl.
*H04W 48/18* (2009.01)
*H04W 60/04* (2009.01)

(56) References Cited

U.S. PATENT DOCUMENTS

2020/0059792 A1* 2/2020 Mathison ............... H04W 8/08
2020/0077327 A1* 3/2020 Duan .................... H04W 72/10

OTHER PUBLICATIONS

3GPP TR 23.707 V13.0.0; 3rd Generation Partnership Project; Technical Specification Group Services and System Aspects; Architecture Enhancements for Dedicated Core Networks; Stage 2 (Release 13); Dec. 2014, consisting of 39-pages.

3GPP TR 23.799 V14.0.0; 3rd Generation Partnership Project; Technical Specification Group Services and System Aspects; Study on Architecture for Next Generation (Release 14); Dec. 2016, consisting of 522-pages.

3GPP TSG SA Meeting #74 SP-160934; Title: Next Generation System Session Management Support for Energy Efficiency; Source: Orange; Document for: Approval; Agenda Item: 16P.1; Location and Date: Vienna, Austria, Dec. 7-9, 2016, consisting of 5-pages.

3GPP TS 23.401 V14.2.0; 3rd Generation Partnership Project; Technical Specification Group Services and System Aspects; General Packet Radio Service (GPRS) enhancements for Evolved Universal Terrestrial Radio Access Network (E-UTRAN) access (Release 14); Dec. 2016, consisting of 385-pages.

3GPP TS 23.335 V13.1.0; 3rd Generation Partnership Project; Technical Specification Group Core Network and Terminals; User Data Convergence (UDC); Technical realization and information flows; Stage 2 (Release 13); Mar. 2016, consisting of 39-pages.

* cited by examiner

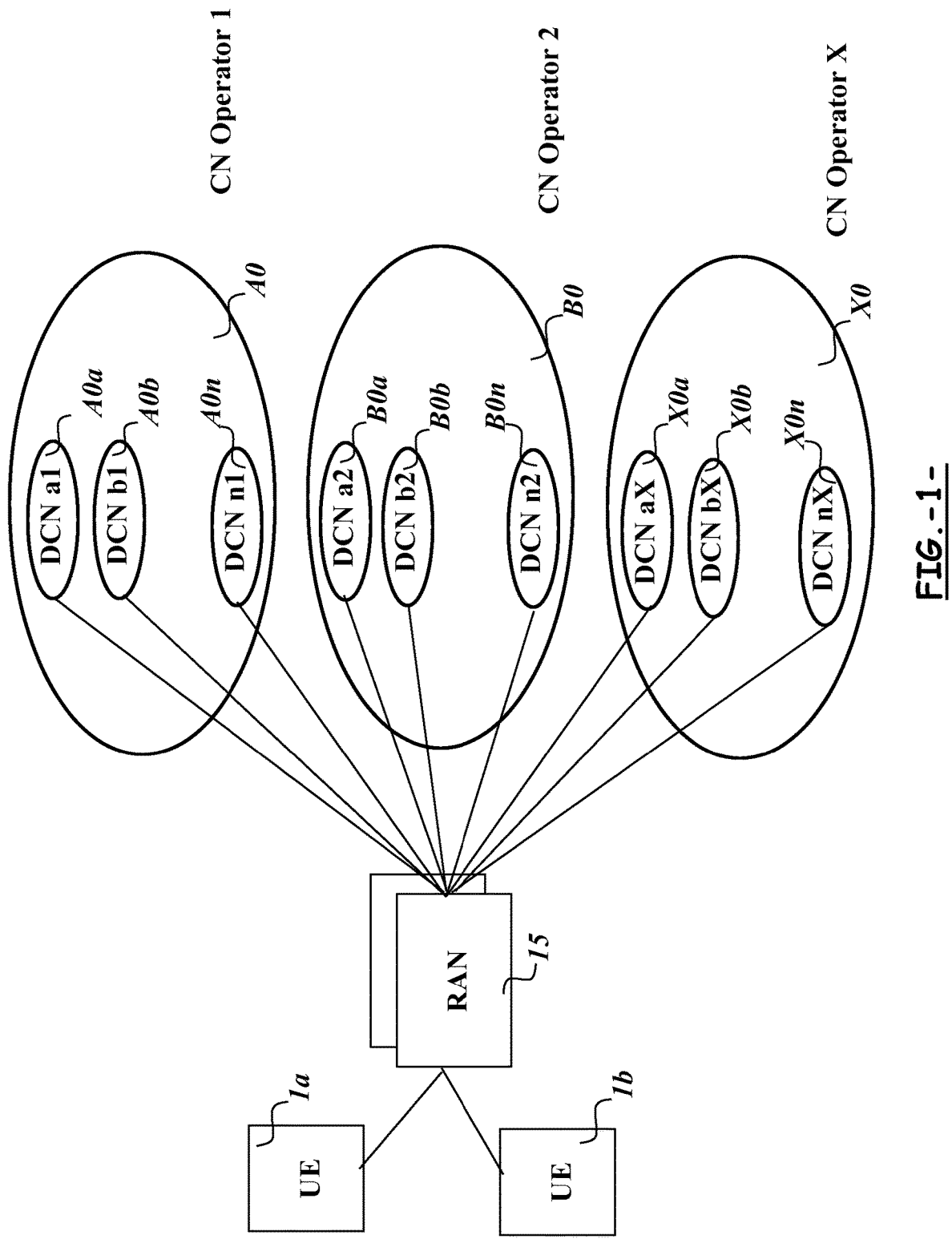
FIG. -1-

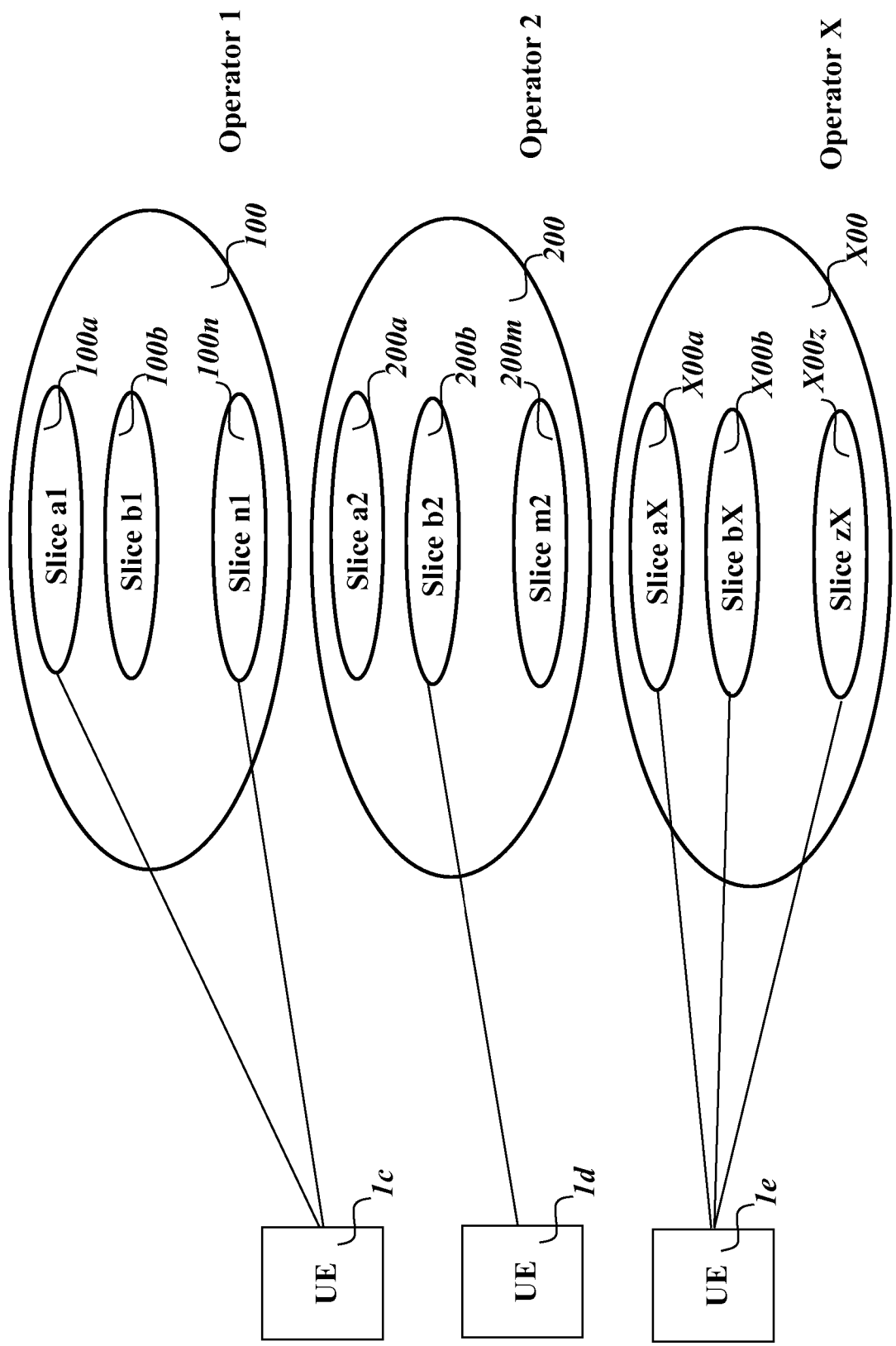
FIG. -2-

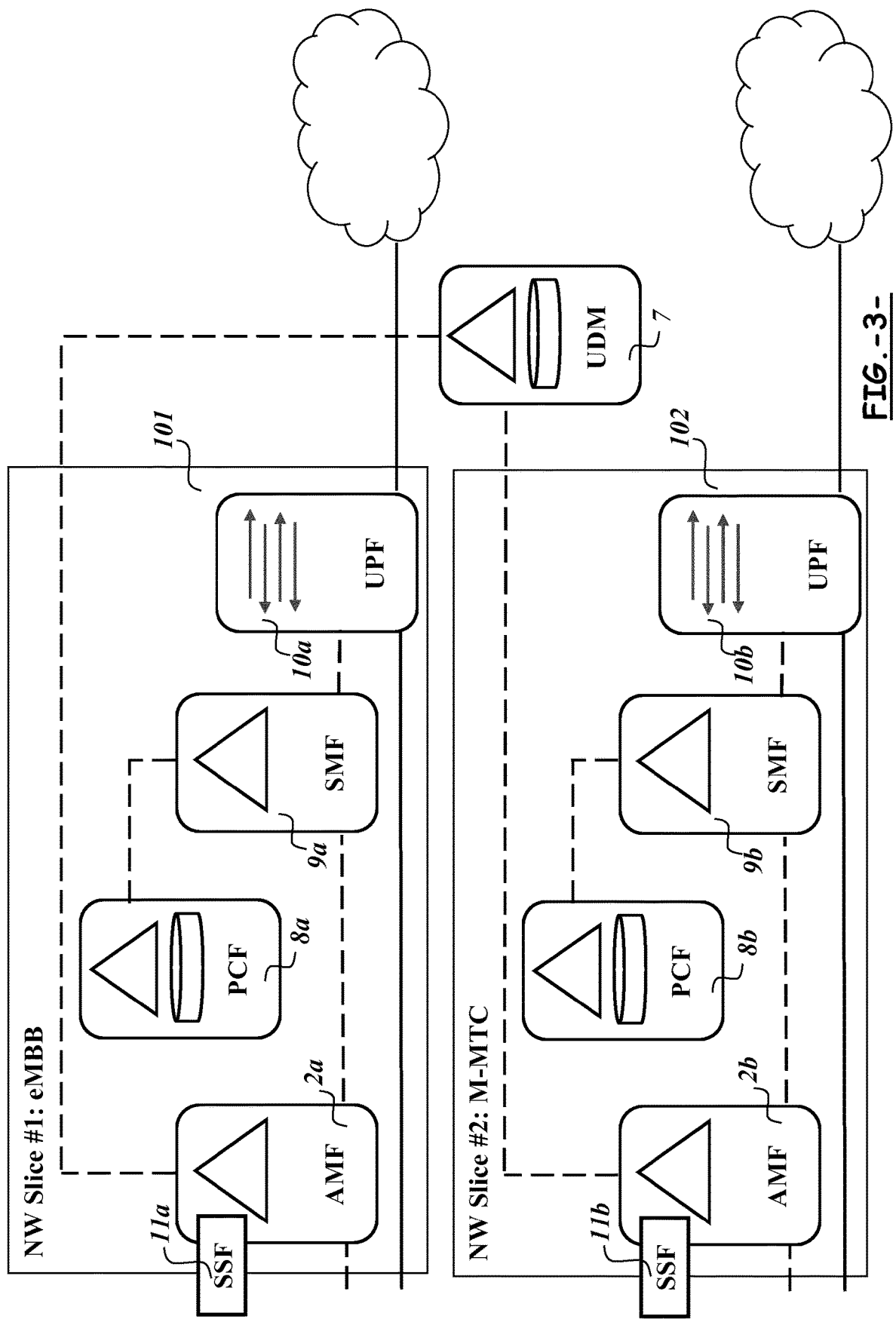
FIG. -3-

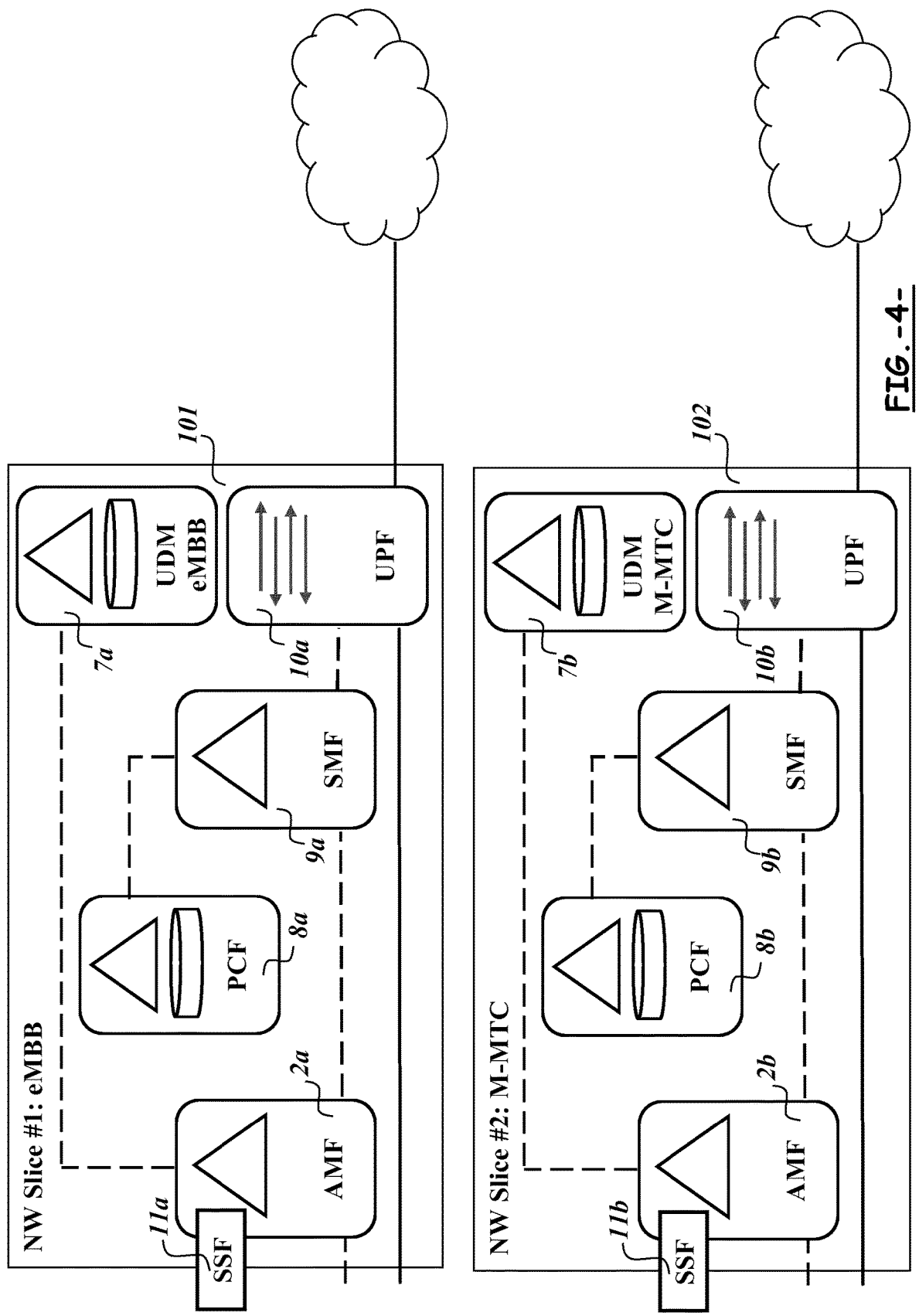
FIG. -4-

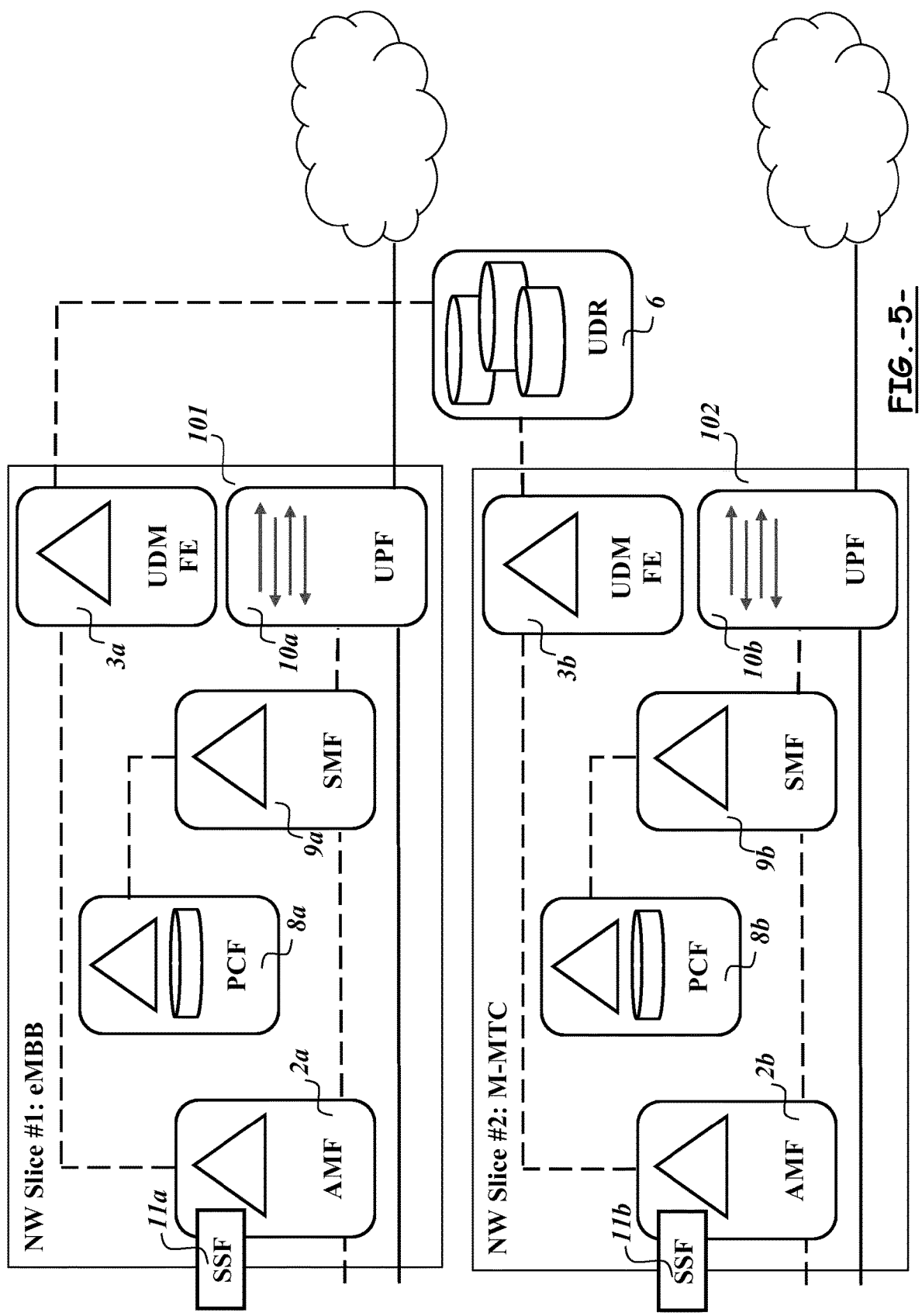
FIG. -5-

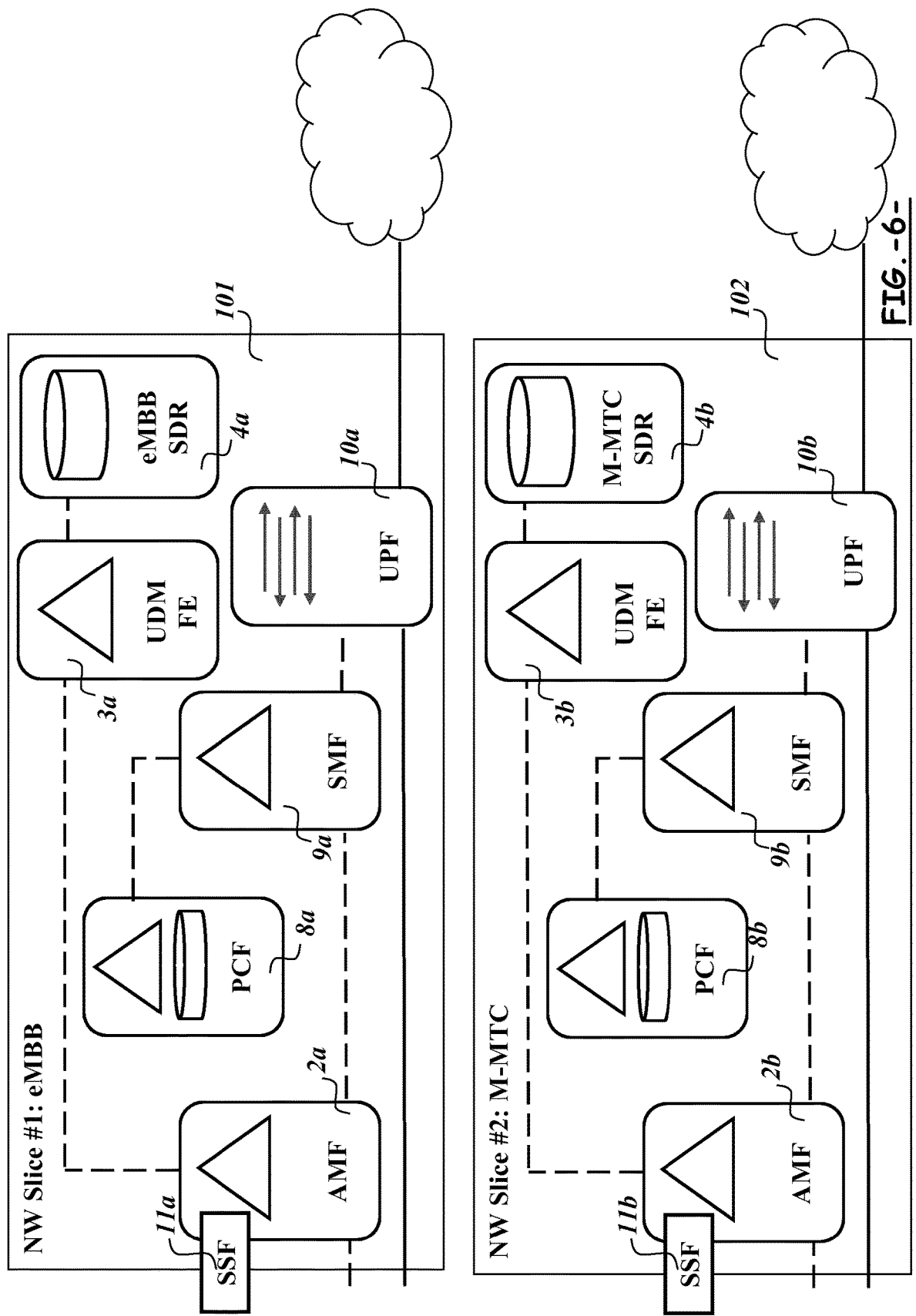
FIG. -6-

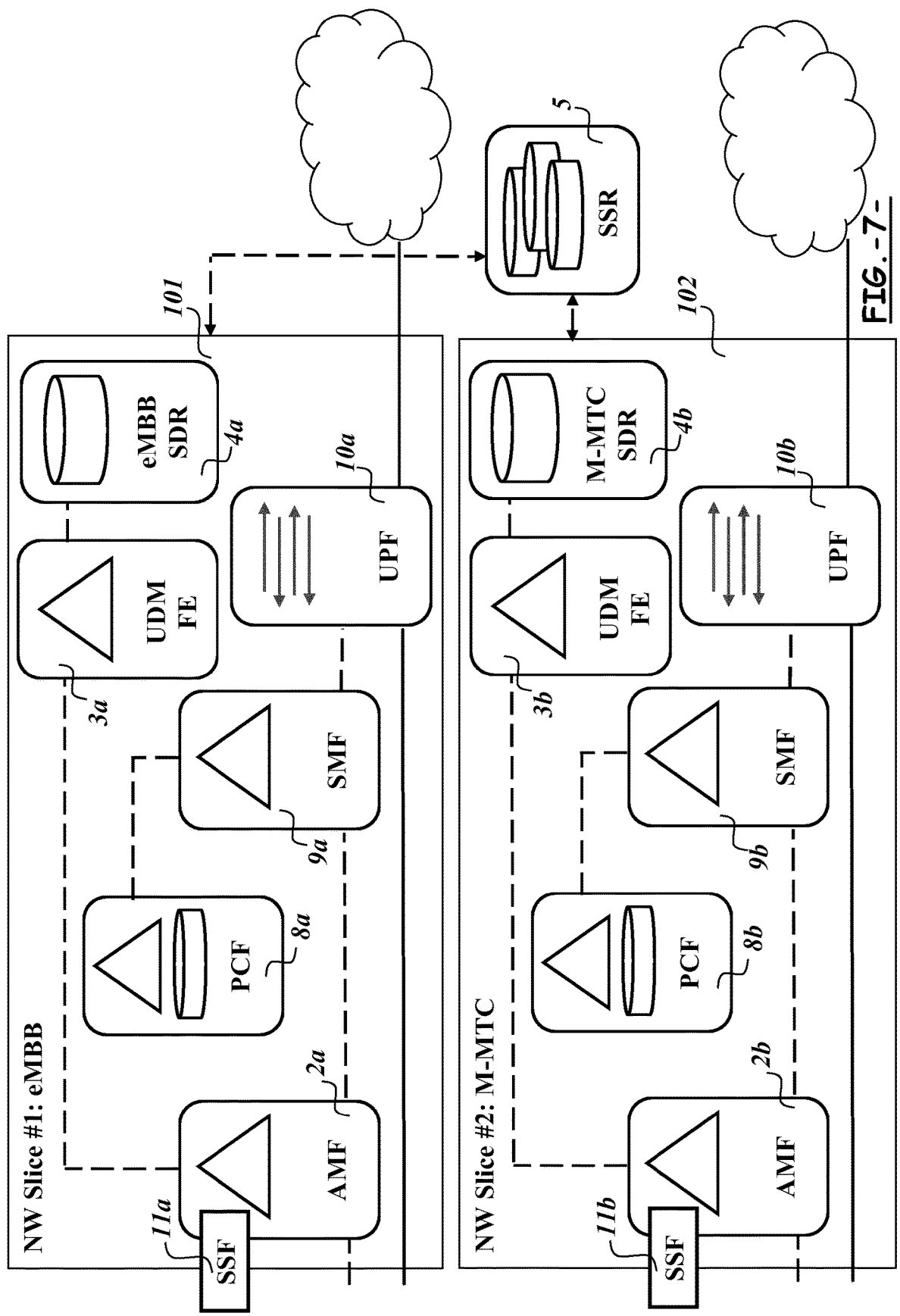
FIG. -7-

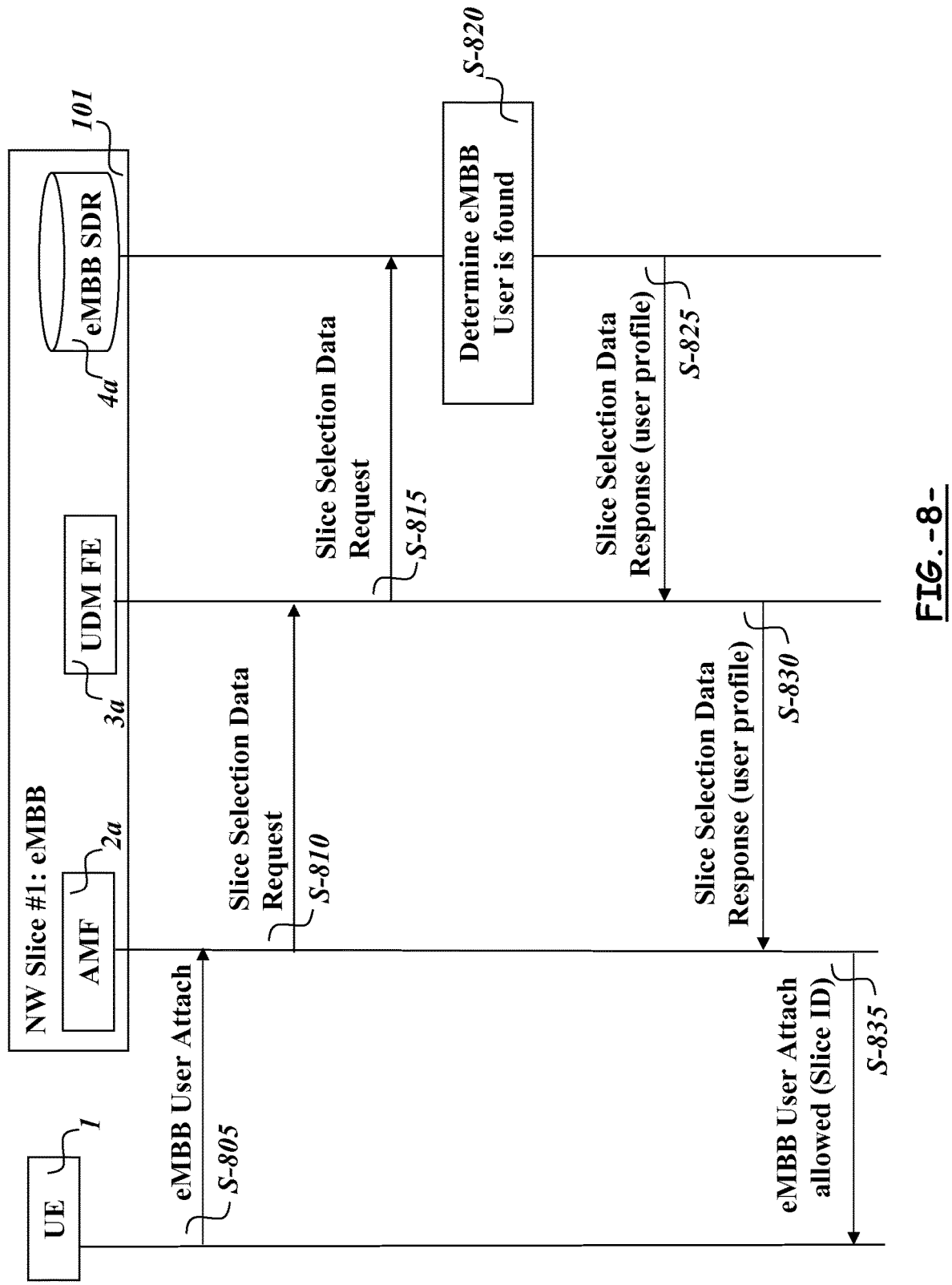
FIG. -8-

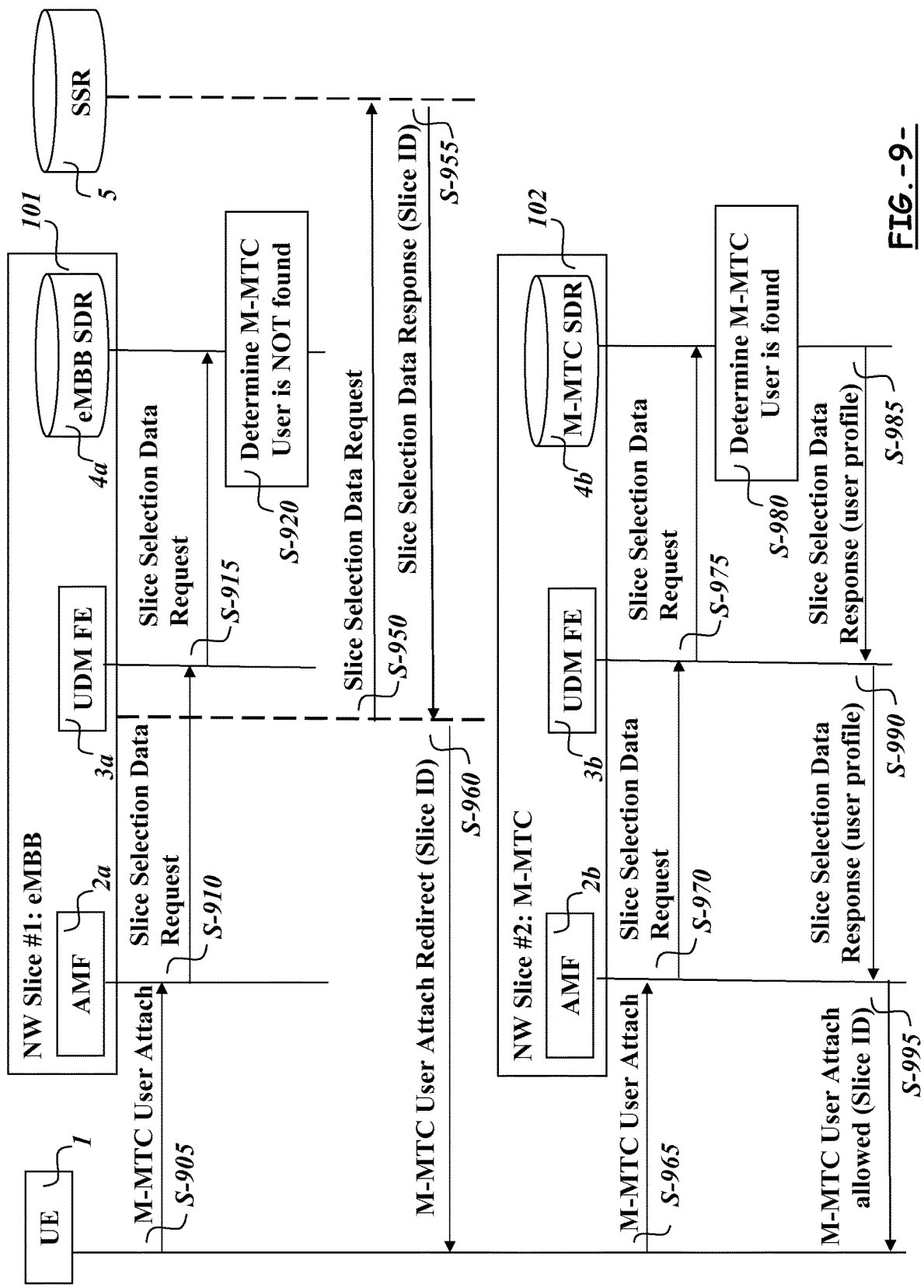
FIG. -9-

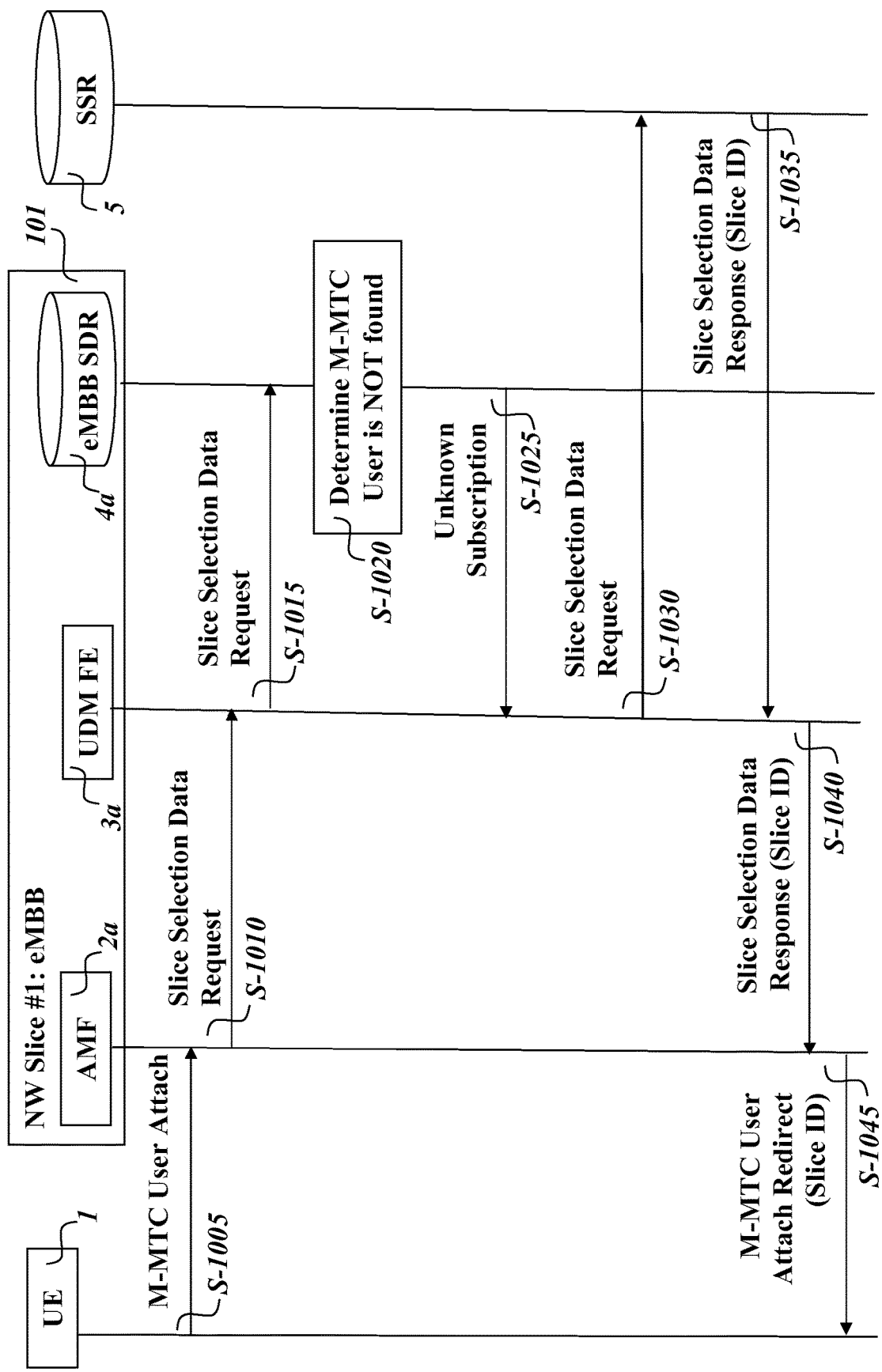
FIG. -10-

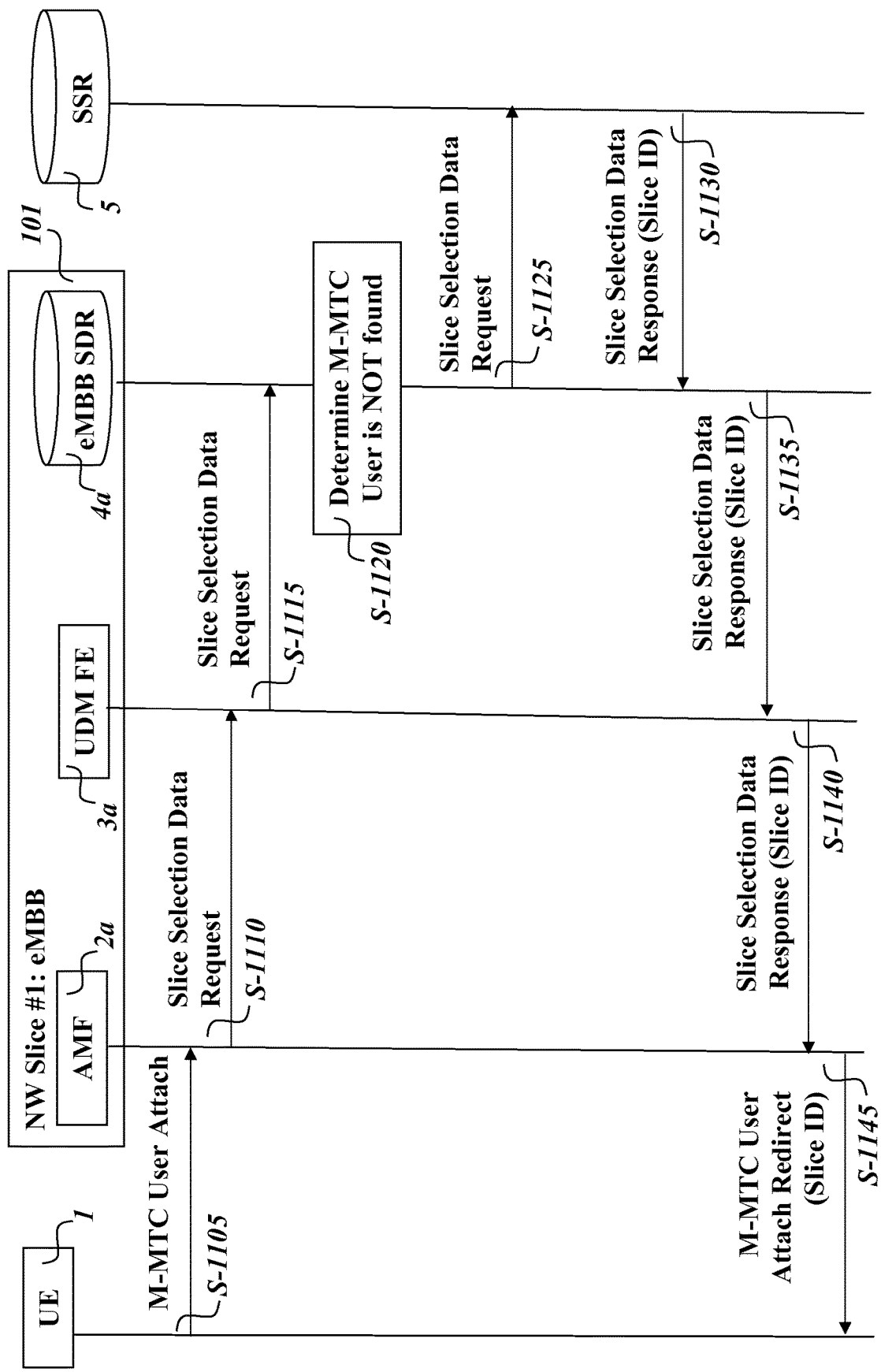
FIG. -11-

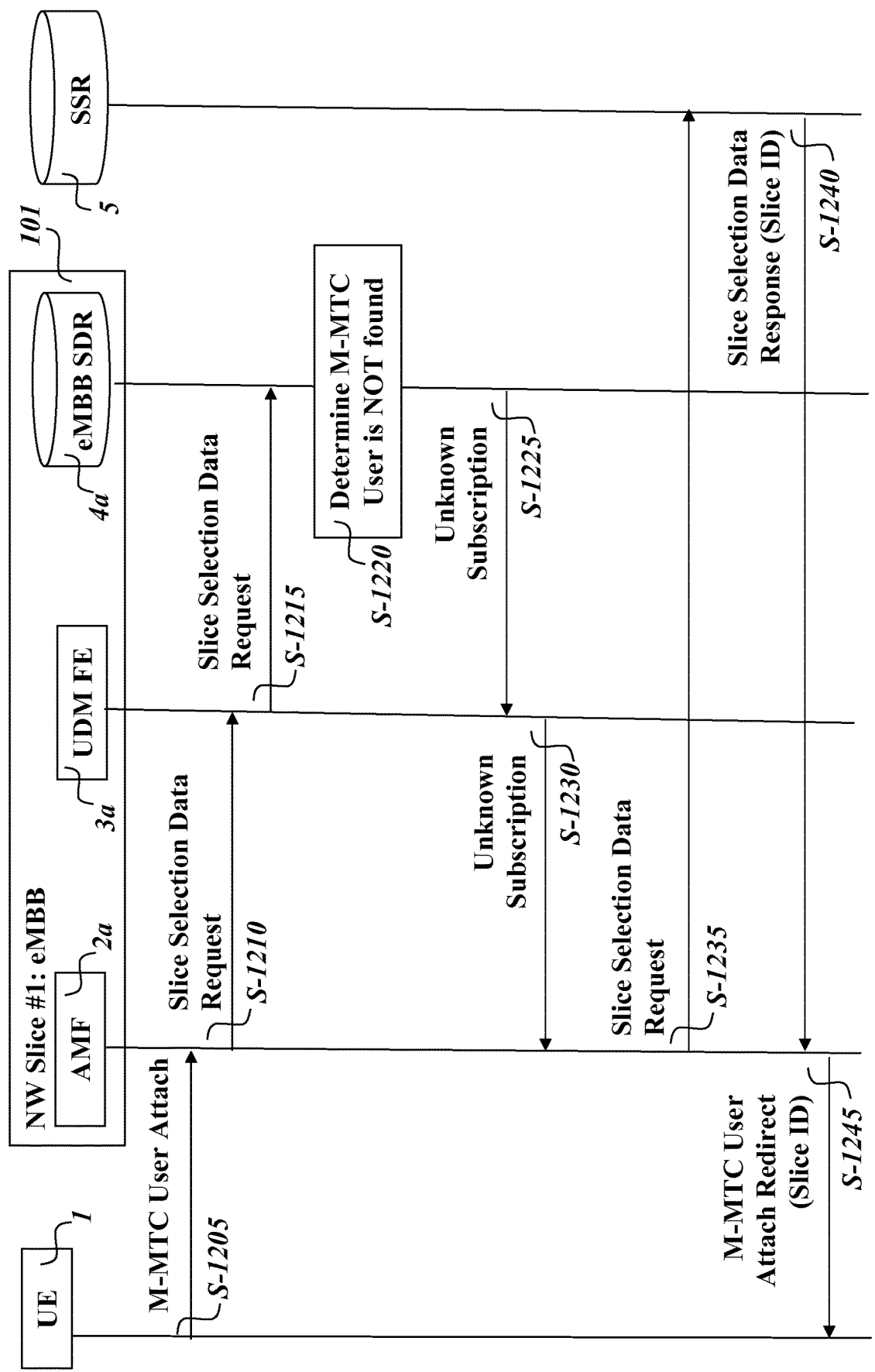
FIG. -12-

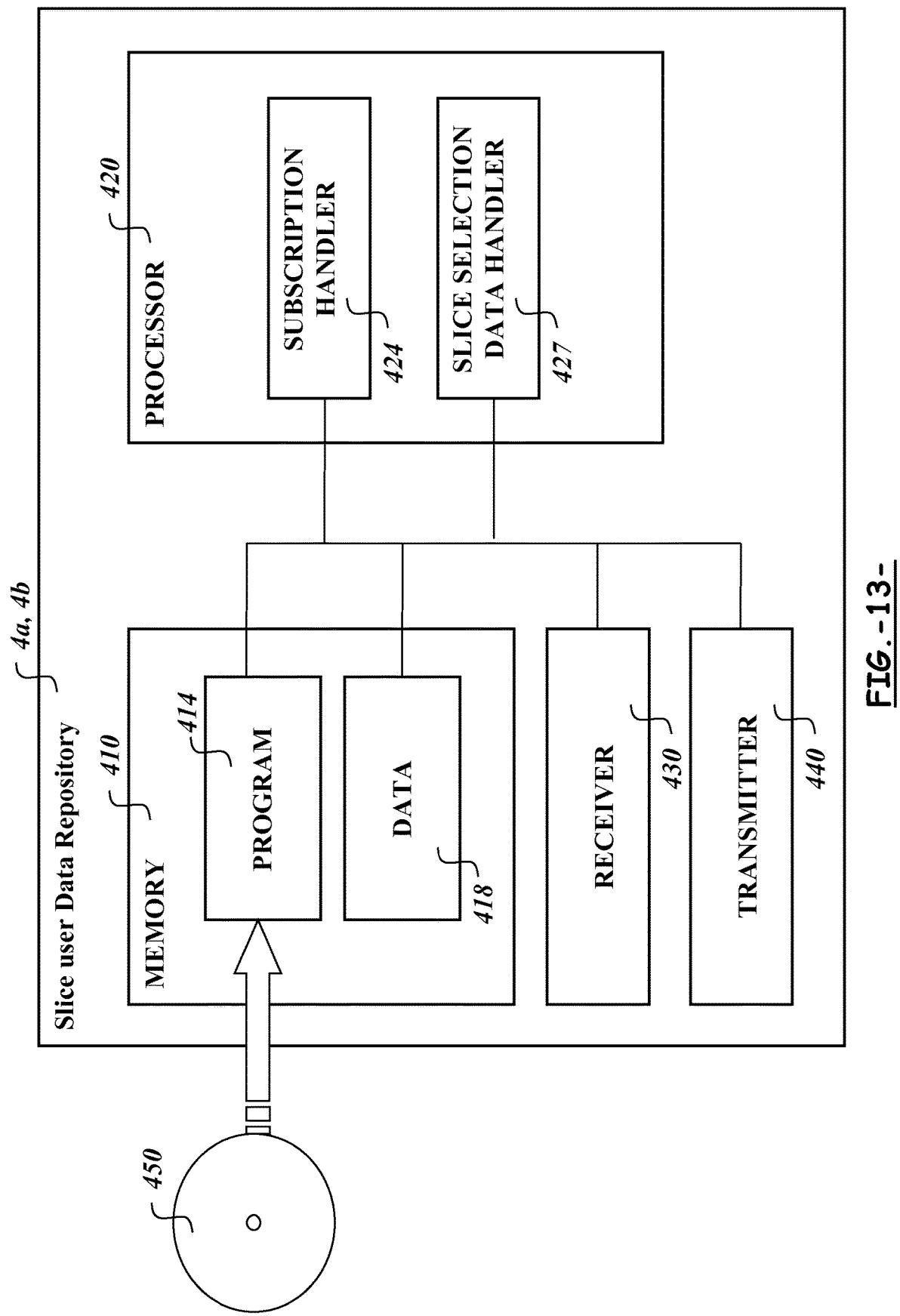
FIG.-13-

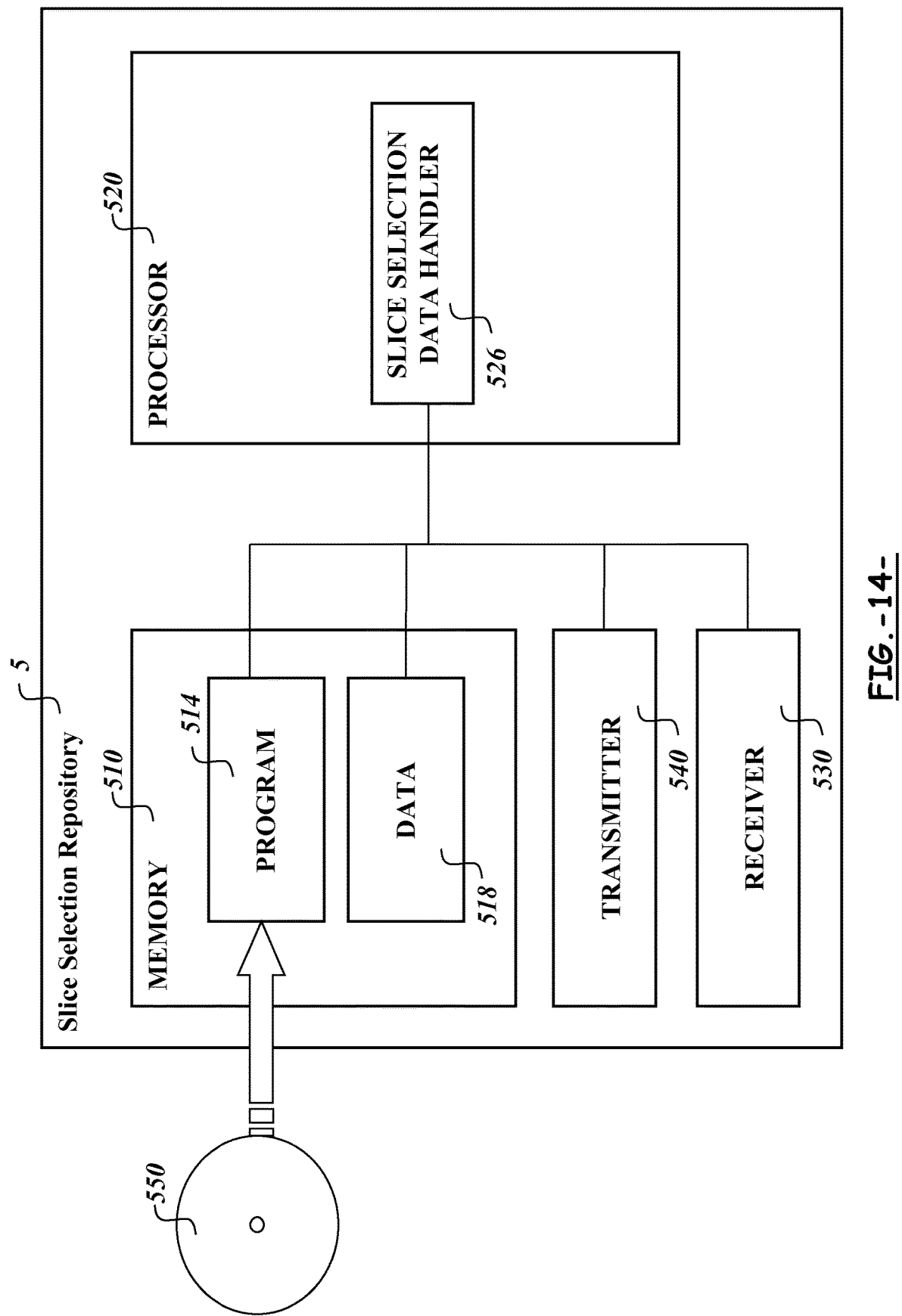
FIG. -14-

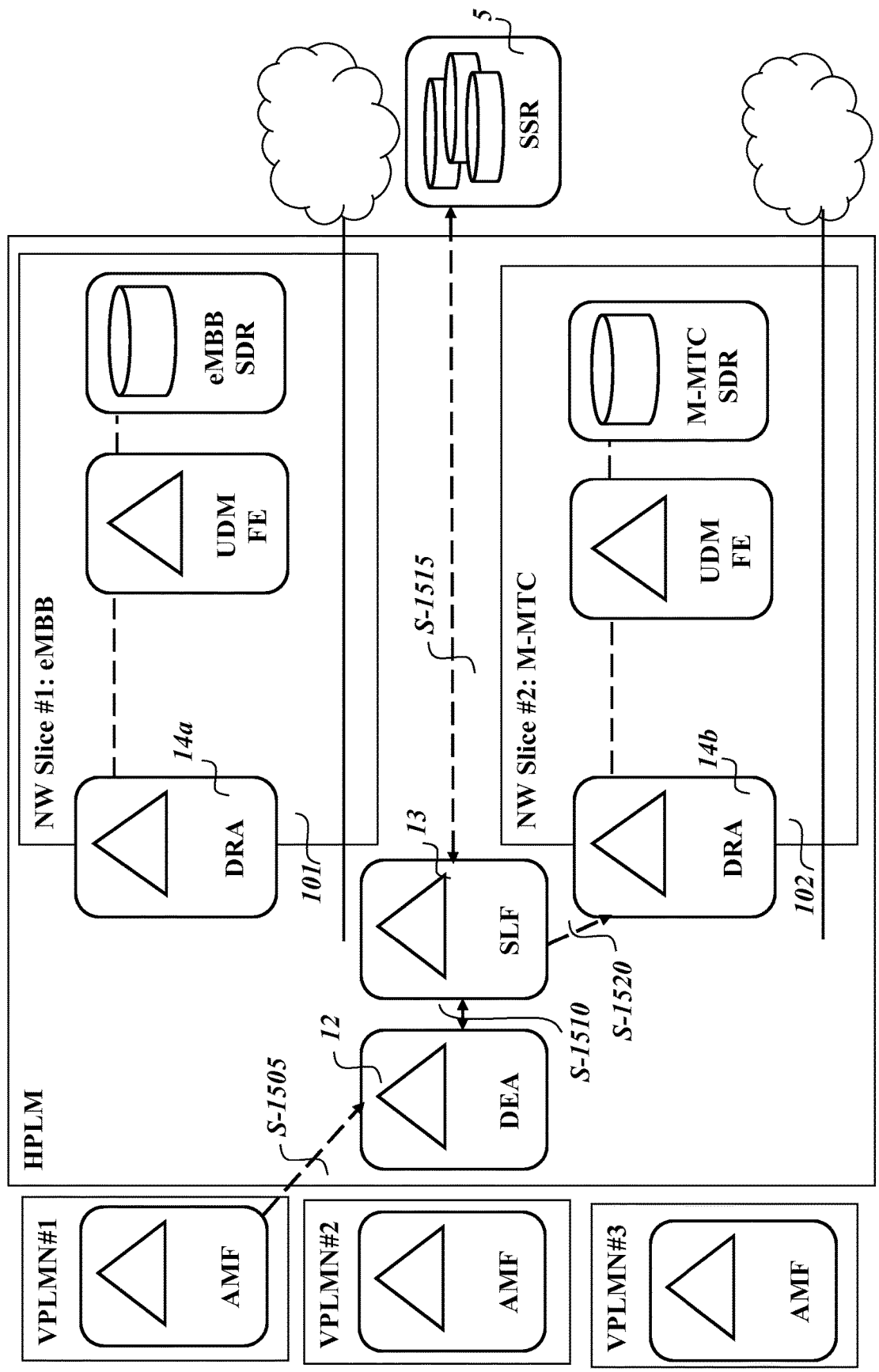
FIG. -15-

FIG. -16-

- holding subscription information for each UE to be served by the network slice, wherein the subscription information comprises slice selection data for the UE — S-1610
- receiving, from an entity of the network slice, a request for slice selection data for a UE — S-1620
- transmitting, toward the entity of the network slice, the subscription information with the slice selection data for the UE — S-1630

FIG. -17-

- holding slice selection data for every UE in the network, wherein the UE is to be served only by a network slice holding subscription information for the UE — S-1710
- receiving, from an entity of a network slice, a request for slice selection data for a UE — S-1720
- transmitting to the entity of the network slice the slice selection data for the UE — S-1730

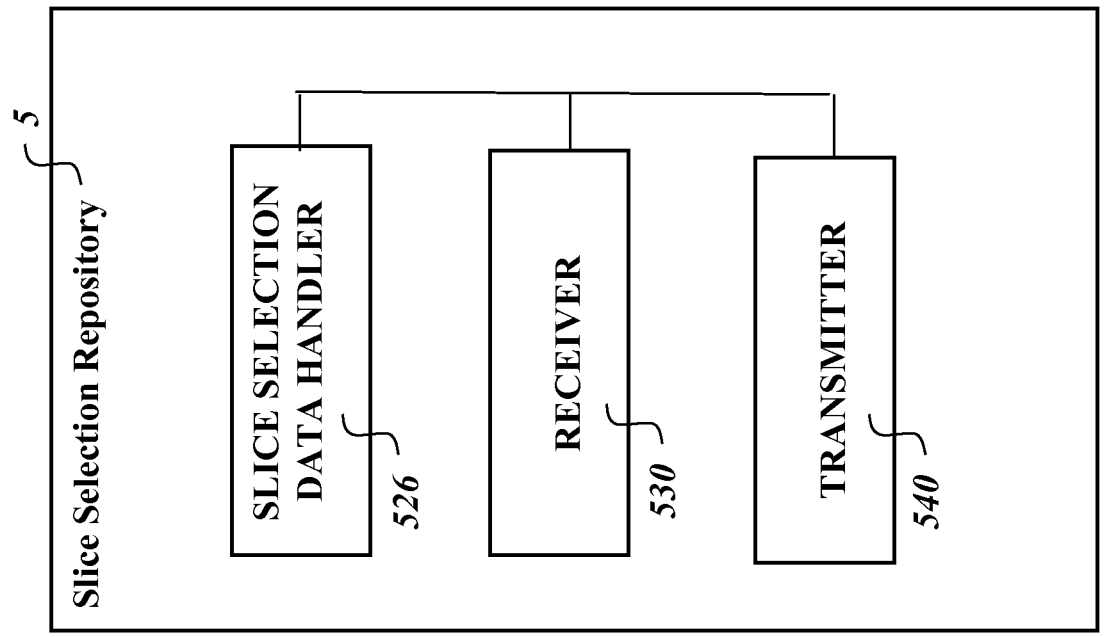
FIG. -19-
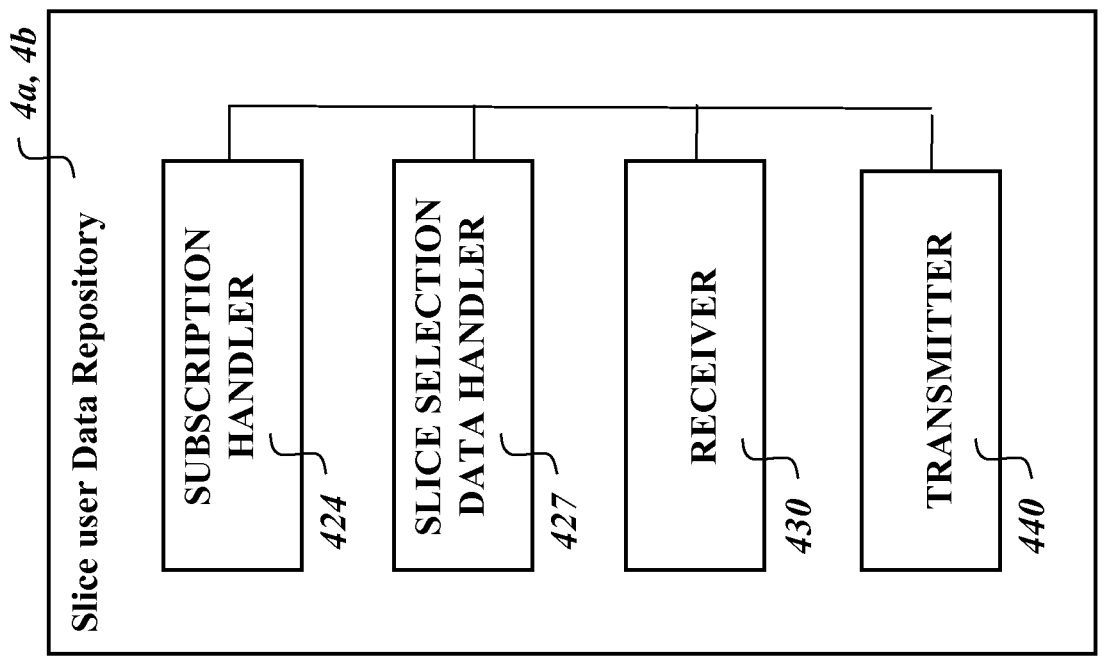
FIG. -18-

METHODS AND APPARATUSES FOR HANDLING SLICE SELECTION DATA FOR A USER

CROSS-REFERENCE TO RELATED APPLICATIONS

This application is a Submission Under 35 U.S.C. § 371 for U.S. National Stage Patent Application of International Application Number: PCT/EP2017/054294, filed Feb. 24, 2017 entitled "METHODS AND APPARATUSES FOR HANDLING SLICE SELECTION DATA FOR A USER," the entirety of which is incorporated herein by reference.

TECHNICAL FIELD

The present invention generally relates to network slicing; and, more specifically, the invention relates to improving the isolation of a user data management function node in network slicing scenarios.

BACKGROUND

3GPP TS 23.401 V14.2.0 specifies the deployment of multiple Dedicated Core Networks (DCNs) within a PLMN with each DCN consisting of one or multiple CN nodes. Each DCN may be dedicated to serving specific type(s) of subscriber. This is an optional feature and enables DCNs to be deployed for one or multiple radio access technologies (RATs). In this architecture, each operator core network (CN) may consist of a number of DCN elements and different operator CNs may share one or more radio access networks (RANs). For example, FIG. 1 illustrates several core networks sharing a RAN accessed by several users, wherein each core network comprises a number of DCNs.

On the other hand, 3GPP TR 23.799 V14.0.0 is ongoing with the objective of designing a system architecture for next generation (NG) networks. In this respect, an architectural requirement is the deployment of multiple end-to-end logical networks, i.e. network slices. A network slice is thus an end-to-end network and includes a RAN and a number of CN function elements. For example, FIG. 2 illustrates several networks, wherein each network comprises a number of network slices, and wherein a user may be assigned to one or more network slices in a network where the user holds a subscription.

One may thus consider an operator CN comprising multiple DCN elements to be a sort of network comprising multiple network slices, each comprising specific CN function elements.

The motivations for deploying DCNs/slices may be of a different nature, e.g. to provide DCNs/slices with specific characteristics/functions or scaling, to isolate specific UEs or subscribers (e.g. M2M subscribers, subscribers belonging to a specific enterprise or separate administrative domain, etc.).

Though isolation of network resources is one of the drivers for slicing a network (irrespective of to what extent) there may still be shared network resources between network slices, e.g. a network function may be shared by several network slices.

The specific deployment option (i.e. dedicated or shared) of a network function may be many times a trade-off between the level of isolation or separation required for the network resources and its optimal use but, all in all, providing a deployment with flexibility is a valuable network function characteristic.

On the other hand, a network function which can only be deployed as a shared function becomes the most disadvantageous and restrictive case. For example, overload and/or congestion originated from any slice may affect the others, the life cycle management of any slice turns to be dependent with the others, operator's business might be negatively influenced with new services having strict isolation requirements.

In this context, a fully isolated DCN, or a fully isolated slice, comprises all the required network resources to provide a service for users served by that DCN/slice, and does not need participation of any other network resource shared with, or belonging to, another DCN/slice. Generally speaking, operating different network slices in parallel with isolation prevents data communication in one slice to negatively impact services in other slices.

The deployment of DCNs/slices means in practice an additional partitioning of the PLMN, and it requires dedicated mechanisms to select a DCN/slice to serve each UE. In selecting the appropriate DCN/slice, subscription information assists the selection and should be available for every DCN/slice in a PLMN. 3GPP TS 23.401 V14.2.0 discloses the DCN selection mechanisms which may be a baseline for 5G network slice selection. Some principles for DCN selection are discussed in the following.

UEs may provide the network with an indication about the DCN to serve them (i.e. DCN-ID). The DCN-ID is configured and assigned to the UE by the serving PLMN, and stored in the UE on per PLMN basis. RAN selection of a CN node within a specific DCN is based on the UE-provided DCN-ID (if any) and locally configured operator's policies. At initial UE access to the network, if sufficient information is not available for RAN to select a specific DCN, the RAN may select a CN node within a default DCN and a redirection to another DCN may then be required. The accessed-to CN serving node, irrespective of whether its selection was assisted or not by a UE-provided DCN-ID, verifies whether the UE shall be actually served by this DCN.

Such a verification may be assisted by a dedicated subscription information component, being based on an operator's configured mapping "subscription information component-to-DCN", other locally configured operator's policies, and the UE related context information available at the serving node, such as e.g. information about roaming.

If the accessed-to DCN concludes that the UE shall be served by another DCN, it triggers a rerouting/redirection procedure towards the correct DCN via RAN. The procedure can be identified as of this kind by the receiving DCN, so that another rerouting/redirection procedure is not triggered. The receiving DCN verifies it is the one to serve the UE. As part of the access response to the UE the corresponding DCN-ID is provided, so that the UE shall update its stored DCN-ID for this PLMN if different than the initially provided value, if any. This way the subsequent UE accesses to the network would be directed to the correct DCN.

It is worthy to note that, in practice, it cannot be taken for granted that all UEs within a PLMN would be capable to provide and handle a DCN-ID, e.g. some legacy devices. Those type of UEs will be initially directed towards the default DCN at every access to the network, being then the default DCN the one to redirect them (if needed) to their correct DCN.

Consequently, the Home Subscriber Server (HSS) as well as its evolutions User Data Management (UDM), also known as Unified Data Management function, and NG Subscriber Data Management function (SDM), both hosting the subscription information in the PLMN, are expected to be a shared or common network function for all DCNs and/or slices in the PLMN. More specifically, HSS/UDM/SDM are provided with application logic, as front-ends, enabling to access a user data repository (UDR) where the user data for all users of the PLMN are stored. That implies the UDR is the entity to be a shared and a common network function across network slices within the PLMN, and the shared UDR stores data for all users in the PLMN and interworks with all slice instances.

To this end, a Slice Selection Function (SSF), as illustrated in FIG. 3, would be able to select the target slice for a UE irrespective of what the UE itself may provide, i.e. no information, wrong information or correct information.

Note that in FIG. 3 and hereinafter, and for the sake of simplicity, the 5G naming of the functions is used; however, all figures and descriptions are also applicable to similar functions in 2G/3G/4G (AMF→MME/SGSN, UDM→HSS, HLR etc.) as well as to future functions with similar purpose. Likewise, the DCN selection may also be referred to as the SSF in the following. The shared UDM shown in FIG. 3 stores data for all users within the PLMN, even though these users are served by different logical network instances, i.e. different network (NW) slices. For example, NW Slice #1 provides service to evolved Mobile Broad-Band (eMBB) users, while NW Slice #2 provides service to Massive-Machine Type Communications (M-MTC) users.

This UDM deployment, shown in FIG. 3 as a resource shared by all NW slices, enables to comply with DCN/slice selection mechanism demands as if e.g. an M-MTC user attach request is directed to the Access and Mobility Management Function (AMF) within the NW Slice #1, the SSF instance embedded within this AMF is able to retrieve the subscription information from the UDM thus enabling the AMF to determine that the request shall be served instead by NW Slice #2. Then the AMF within NW Slice #1 triggers the procedures to redirect the M-MTC user attach request towards NW Slice #2.

However, this UDM deployment approach breaks the isolation between NW Slice #1 and NW Slice #2. That is, a network slice cannot apparently hold its own UDM. One might propose the replication of the UDM in all network slices, but this would represent a huge amount of operation and maintenance activities to ensure consistency amongst the replicated UDMs.

SUMMARY

The present invention is aimed to at least minimize the above drawbacks and provides for new methods for selecting a network slice to serve a user equipment, UE, in a network that comprises a plurality of network slices, as well as new apparatuses participating in at least some of these methods.

In accordance with a first aspect of the present invention, there is provided a method for selecting a network slice to serve a user equipment, UE, in a network that comprises a plurality of network slices.

This method comprises: receiving, at an access and mobility management function, AMF, of a network slice, an attach request originated from a UE; forwarding, from the AMF toward a slice user data repository, SDR, a request for slice selection data; and determining, at the SDR, if subscription information is available at the SDR for the UE being served in this network slice.

If subscription information is available at the SDR, this method also comprises: forwarding, from the SDR toward the AMF, the subscription information with the slice selection data for the UE; and transmitting, from the AMF toward the UE, allowance of the attach request of the UE to this network slice, the allowance based on the received subscription information.

If subscription information is not available at the SDR, this method also comprises: receiving the slice selection data for the UE, at the AMF, wherein the slice selection data are obtained from a slice selection repository, SSR, which is external to the network slice and shared by the plurality of network slices; and redirecting, from the AMF, the attach request of the UE toward a different network slice based on the received slice selection data for the UE.

In an embodiment of this method, forwarding the request for slice selection data, from the AMF toward the SDR, may comprise transmitting this request through a front-end, FE, which connects in the network slice the AMF and the SDR, and is equipped with application logic to access the SDR. In this embodiment, receiving at the AMF the subscription information with the slice selection data comprises receiving the subscription information with the slice selection data from the FE.

This method, in an embodiment and in order to obtain the slice selection data from the SSR, may further comprise: transmitting a request for the slice selection data, from any one of the SDR and the AMF toward the SSR; and receiving the slice selection data, at the any one of the SDR and the AMF from the SSR. When the slice selection data is received at the SDR, the method may further comprise forwarding the slice selection data from the SDR toward the AMF.

This method, in another embodiment and also in order to obtain the slice selection data from the SSR, may further comprise: transmitting a request for the slice selection data, from the FE toward the SSR, and receiving the slice selection data, at the FE from the SSR. In this case, the method may further comprise forwarding the slice selection data from the FE toward the AMF.

Generally speaking in this method, receiving at the AMF the slice selection data, which are obtained from the SSR, comprises receiving this slice selection data from one of the SDR, the FE and the SSR.

In an embodiment of this method, the SDR is an entity of the network slice and is not shared with other network slices; whereas in another embodiment, the SDR is external to the network slice, and the SSR comprises the SDR.

Generally speaking, the FE throughout this specification may be any one of a unified data management front-end, UDM-FE, a Subscriber Data Management front-end, SDM-FE, and a home subscriber server front-end, HSS-FE.

In accordance with a second aspect of the present invention, there is provided a distributed slice data repository for handling slice selection data for users equipped with a user equipment, UE, in a network that comprises a plurality of network slices.

This distributed slice data repository comprises: a slice user data repository, SDR, per network slice basis, and a slice selection repository, SSR, which is external to any network slice and shared by the plurality of network slices. That is, this distributed slice data repository comprises a unique SSR for the network, and an SDR for each network slice.

The SDR and the SSR are individually discussed as further aspects of the invention in the following, and these individual discussions may be incorporated in the aforesaid distributed slice data repository.

In accordance with a third aspect of the present invention, there is provided a slice user data repository, the aforesaid SDR, participating per network slice basis in the aforesaid distributed slice data repository for handling slice selection data for users equipped with a user equipment, UE, in a network that comprises a plurality of network slices.

This SDR is configured to: hold subscription information for each UE to be served by the network slice, wherein the subscription information comprises slice selection data for the UE; receive, via a receiver from an entity of the network slice, a request for slice selection data for a UE; and transmit, via a transmitter toward the entity of the network slice, the subscription information with the slice selection data for the UE.

In particular, the entity of the network slice may be any one of a mobility management function, AMF, of the network slice, and a front-end, FE, which connects in the network slice the AMF and the SDR, and is equipped with application logic to access the SDR.

In an embodiment, if the subscription information for a UE is not held and available, the SDR may further be configured to transmit, via the transmitter toward the entity of the network slice, an unsuccessful result indicating no subscription information exists at the SDR for the UE.

In another embodiment, if the subscription information for a UE is not held and available, the SDR may further be configured to: transmit a request for slice selection data for the UE, via the transmitter toward a slice selection repository, the aforesaid SSR; receive the slice selection data, from the SSR via the receiver; and forward the received slice selection data, via the transmitter toward the entity of the network slice.

In an embodiment where the entity of the network slice is the FE, the SDR may be external to the network slice, and the SSR may comprise the SDR.

In another embodiment where the entity of the network slice is the FE, the SDR may be an entity of the network slice and not shared with another network slice.

In accordance with a fourth aspect of the present invention, there is provided a slice selection repository, the aforesaid SSR, participating in the aforesaid distributed slice data repository for handling slice selection data for users equipped with a user equipment, UE, in a network that comprises a plurality of network slices, the SSR being external to any network slice and shared by the plurality of network slices.

This SSR is configured to: hold slice selection data for every UE in the network, wherein the UE is to be served only by a network slice holding subscription information for the UE; receive, via a receiver from an entity of a network slice, a request for slice selection data for a UE; and transmit, via a transmitter to the entity of the network slice, the slice selection data for the UE.

In an embodiment for this SSR, the entity of the network slice may be any one of a mobility management function, AMF, of the network slice, and a front-end, FE, which connects in the network slice the AMF and a slice user data repository, the aforesaid SDR, wherein the FE is equipped with application logic to access the SDR.

In this embodiment, the SDR may be external to the network slice, and the SSR may comprise. the SDR.

In another embodiment for this SSR, the entity of the network slice may be any one of a mobility management function, AMF, of the network slice, a slice user data repository, the aforesaid SDR, and a front-end, FE, which connects in the network slice the AMF and the SDR, and is equipped with application logic to access the SDR.

In this another embodiment, the SDR may be an entity of the network slice and not shared with other network slices.

In accordance with a fifth aspect of the present invention, there is provided a method for selecting a network slice to serve a user equipment, UE, in a network that comprises a plurality of network slices, the method applying at a slice user data repository, SDR, participating in the method per network slice basis.

This method comprises: holding subscription information for each UE to be served by the network slice, wherein the subscription information comprises slice selection data for the UE; receiving, from an entity of the network slice, a request for slice selection data for a UE; and transmitting, toward the entity of the network slice, the subscription information with the slice selection data for the UE.

In embodiments of this method, the entity of the network slice may be any one of a mobility management function, AMF, of the network slice, and a front-end, FE, which connects in the network slice the AMF and the SDR, and is equipped with application logic to access the SDR.

In an embodiment, if the subscription information for a UE is not held and available at the SDR, the method may further comprise transmitting, toward the entity of the network slice, an unsuccessful result indicating no subscription information exists at the SDR for the UE.

In another embodiment, if the subscription information for a UE is not held and available at the SDR, the method may further comprise: transmitting a request for slice selection data for the UE toward a slice selection repository, the aforesaid SSR, which is external to any network slice and shared by the plurality of network slices; receiving the slice selection data, from the SSR; and forwarding the received slice selection data toward the entity of the network slice.

Advantageously for the above embodiments of this method, the SDR may be an entity of the network slice and not shared with other network slices.

Alternatively, in another embodiment of this method, the SDR may be external to the network slice, the SSR may comprise the SDR, and the entity of the network slice may be an FE, which connects in the network slice the AMF and the external SDR.

In accordance with a sixth aspect of the present invention, there is provided a method for selecting a network slice to serve a user equipment, UE, in a network that comprises a plurality of network slices, the method applying at a slice selection repository, the aforesaid SSR, which participates in the method per network basis, is external to any network slice and shared by the plurality of network slices.

This method comprises: holding slice selection data for every UE in the network, wherein the UE is to be served only by a network slice holding subscription information for the UE; receiving, from an entity of a network slice, a request for slice selection data for a UE; and transmitting to the entity of the network slice the slice selection data for the UE.

In embodiments of this method, the entity of the network slice may be any one of a mobility management function, AMF, of the network slice, and a front-end, FE, which connects in the network slice the AMF and a slice user data repository, the aforesaid SDR, wherein the FE is equipped with application logic to access the SDR. Where the entity of the network slice is the FE, the SDR may be external to the network slice, and the SSR may comprise the SDR.

In other embodiments of this method, the entity of the network slice is any one of a mobility management function, AMF, of the network slice, a slice user data repository, SDR, and a front-end, FE, which connects in the network slice the AMF and the SDR, and is equipped with application logic to access the SDR. In these other embodiments the SDR may be an entity of the network slice and not shared with other network slices.

In accordance with a seventh aspect of the present invention, there is provided a computer program, comprising instructions which, when executed on at least one processor, cause the at least one processor to carry out the method executed at the SDR for selecting a network slice to serve a user equipment, UE, in a network that comprises a plurality of network slices.

In accordance with an eighth aspect of the present invention, there is provided a computer program, comprising instructions which, when executed on at least one processor, cause the at least one processor to carry out the method executed at the SSR for selecting a network slice to serve a user equipment, UE, in a network that comprises a plurality of network slices.

BRIEF DESCRIPTION OF THE DRAWINGS

The features, objects and advantages of the invention will become apparent by reading this description in conjunction with the accompanying drawings, in which:

FIG. 1 represents an architecture reference model for DCNs/DECOR.

FIG. 2 represents an architecture reference model for 5G network slicing.

FIG. 3 illustrates a UDM deployment as a shared resource amongst network slices.

FIG. 4 illustrates a deployment of UDMs per network slice basis, which does not provide compliance with DCN/slice selection mechanism demands.

FIG. 5 illustrates a UDR deployment as a shared resource amongst network slices, wherein UDM-Fes are deployed per network slice basis.

FIG. 6 illustrates an exemplary embodiment, based on a UDM-FE plus UDR approach, which shows a UDM-FE and a dedicated SDR per network slice basis.

FIG. 7 illustrates the exemplary embodiment shown in FIG. 6 and complemented with an SSR per network basis, external to any network slice and shared by any network slices.

FIG. 8 illustrates an exemplary sequence of actions carried out upon a user attach directed to the network slice where the user holds a subscription, and wherein there is no need to interwork with the SSR.

FIG. 9 illustrates an exemplary sequence of actions carried out upon a user attach directed to a network slice where the user does not hold a subscription, and wherein there is a need to interwork with the SSR to comply with the DCN/slice selection mechanism.

FIG. 10 illustrates an embodiment with an exemplary sequence of actions carried out upon a user attach directed to a network slice where the user does not hold a subscription, wherein the UDM-FE in this network slice interworks with the SSR to obtain slice selection data for the user to attach to another network slice.

FIG. 11 illustrates another embodiment with an exemplary sequence of actions carried out upon a user attach directed to a network slice where the user does not hold a subscription, wherein the dedicated SDR in this network slice interworks with the SSR to obtain slice selection data for the user to attach to another network slice.

FIG. 12 illustrates still another embodiment with an exemplary sequence of actions carried out upon a user attach directed to a network slice where the user does not hold a subscription, wherein the AMF in this network slice interworks with the SSR to obtain slice selection data for the user to attach to another network slice.

FIG. 13 shows a basic component structure of an SDR in accordance with an embodiment.

FIG. 14 shows a basic component structure of an SSR in accordance with an embodiment.

FIG. 15 illustrates an exemplary SSR support in roaming scenarios in accordance with an embodiment.

FIG. 16 illustrates an exemplary sequence of actions carried out by the SDR, in accordance with an embodiment, for selecting a network slice to serve a UE in a network that comprises a plurality of network slices.

FIG. 17 illustrates an exemplary sequence of actions carried out by the SSR, in accordance with an embodiment, for selecting a network slice to serve a UE in a network that comprises a plurality of network slices.

FIG. 18 shows a basic component structure of an SDR in accordance with another embodiment.

FIG. 19 shows a basic component structure of an SSR in accordance with another embodiment.

DETAILED DESCRIPTION

The following describes currently preferred embodiments of apparatuses and methods for selecting a network slice to serve a UE in a network that comprises a plurality of network slices. More particularly, the following also describes an SDR, an SSR and respectively executed methods for selecting a network slice to serve a UE in a network that comprises a plurality of network slices.

In particular, the following describes different embodiments with different ambition lever for isolating network slices.

One might propose the deployment of a fully isolated UDM 7a and 7b per slice basis and comprising user data only for users served by each slice 101 and 102, such as the deployment shown in FIG. 4.

However, this approach would not allow the DCN selection mechanism, whereby in case of a wrong access to a first DCN by a user, the first DCN re-routes the user to a correct second DCN and. That is, with a fully isolated UDM 7a and 7b per slice basis, as shown in FIG. 4, in case of a wrong access to a NW Slice #1 101 by an M-MTC user, the isolated UDM 7a, which is in charge of eMBB users, does not contain data for the M-MTC user and the NW Slice #1 101 cannot re-route the user to a correct NW Slice #2.

In an embodiment illustrated in FIG. 5, the user data is separated from the application logic. The user data is stored in a logically unique User Data Repository 6 (UDR) which is external to any network slice 101 and 102, and shared by any network slice.

In this scenario, a respective Front-End (FE), such as UDM-FE 3a and UDM-FE 3b, at each network slice 101 and 102, handles the application logic to access to the UDR and obtain therefrom the slice selection data for a UE.

In this embodiment shown in FIG. 5, slice isolation is improved as now the UDM-FE can be deployed independently per network slice basis.

For the sake of completeness, FIG. 5 and others also show other network slice components per network slice basis, such as a policy control function (PCF) node 8a and 8b, a session management function (SMF) node 9a and 9b, and a user part function (UPF) node 10a and 10b, which do not participate in embodiments disclosed in this specification. FIG. 5 and others also show an application and mobility management function (AMF) node 2a and 2b per slice basis, each one including a slice selection function (SSF) 11a and 11b. These AMF node 2a and AMF node 2b participate in embodiments and are further discussed in more detail. For the sake of simplicity, the AMF node can further be referred to as AMF.

The isolation level is higher in the embodiment illustrated in FIG. 6, wherein each network slice 101 and 102 is also provided with its own slice user data repository (SDR) 4a and 4b, which only stores subscription information for users served by the network slice. The subscription information for a UE in the SDR comprises slice selection data for the UE.

Even though this embodiment illustrated in FIG. 6 provides the required isolation and completeness for network slices, it still presents the drawbacks commented above in respect of FIG. 4. That is, in the case of a wrong access to a NW Slice #1 101 for eMBB users by an M-MTC user, the SDR 4a does not contain subscription information for the M-MTC user and the NW Slice #1 101 for eMBB users cannot re-route the M-MTC user to a correct NW Slice #2 102 for M-MTC users.

In order to fully support the demands of the DCN/slice selection mechanism, and thus overcome the drawbacks of embodiments in FIG. 4 and FIG. 6, there is provided an embodiment illustrated in FIG. 7. In this embodiment, the same isolation is achieved as in the embodiment of FIG. 6, but it provides the required support for DCN/slice selection.

The embodiment illustrated in FIG. 7 includes the same network slice components as the embodiment shown in FIG. 6, and also includes an additional slice selection repository (SSR) 5 per PLMN basis, wherein this SSR is external to any network slice 101 and 102, and shared by any network slice.

This SSR 5 per PLMN basis, in contrast with the SDR 4a and SDR 4b per network slice basis, does not contain subscription information for users, as the SDRs do, but simply contains slice selection data for all users in the PLMN. That is, whenever a UE accesses a wrong slice and the UE is unknown to the SDR in charge of the network slice, an entity of the network slice obtains slice selection data for the UE from the SSR, so that the UE can be properly re-directed to the correct network slice.

In the context of DCN, the slice selection data may correspond to the so-called "UE Usage Type", such as the exemplary eMBB and M-MTC cited in this specification. In the context of 5G network slicing, the slice selection data includes information about the network slices that a UE is allowed to access; that is, the slice selection data may comprise any one of: a slice service type (SST), a service differentiator (SD), a network slice selection assistance information (NSSAI), a session management NSSAI (SM-NSSAI), corresponding default values, and combinations thereof, for each network slice allowed for a user.

That is, the slice selection data may comprise any one of: UE Usage Type, SST, SD, NSSAI, SM-NSSAI, corresponding default values, and combinations thereof, for each network slice allowed for a user.

The embodiment illustrated in FIG. 7 thus provides a high isolation as required for network slicing, whilst also supports the DCN/slice selection mechanism. In this embodiment, the SSR 5 is exclusively accessed by each network slice upon receiving attach requests for users not served by that network slice, as further discussed with reference to embodiments illustrated in FIG. 8 and FIG. 9.

FIG. 8 illustrates an embodiment of a method that may be applied when a user directly accesses to the network slice where the user holds a subscription.

In this embodiment illustrated in FIG. 8, the AMF 2a of a network slice 101 for eMBB users receives during step S-805 an eMBB user attach from UE 1, and forwards during step S-810 a slice selection data request toward the SDR 4a, e.g. via the UDM-FE 3a, which in turn transmits during step S-815 the slice selection data request to the SDR 4a.

In an embodiment not illustrated in any drawing, but which may be comparable to the network slices illustrated in FIG. 4, the SDR 4a and 4b may include the application logic of respective UDM-FE 3a and 3b. In this case, the AMF 2a would directly transmit the slice selection data request to the SDR 4a.

Back to the embodiment illustrated in FIG. 8, the SDR 4a, which is in charge of subscription information for eMBB users, may determine during step S-820 that the eMBB user is found, and returns during step S-825 subscription information with slice selection data toward the AMF 2a, e.g. via the UDM-FE 3a, which in turn transmits during step S-830 the subscription information with the slice selection data to the AMF 2a.

As commented above, if the SDR 4a includes the application logic of the UDM-FE 3a, the SDR 4a would directly transmit the subscription information with the slice selection data to the AMF 2a.

Then, the AMF 2a transmits during step S-835 allowance of the attach request of the UE to this network slice 101. This allowance is based on the received subscription information for the UE.

FIG. 9 illustrates an embodiment of a method that may be applied when a user accesses to a network slice where subscription information for the user is not held, and interaction with the SSR is required.

In this embodiment illustrated in FIG. 9, the AMF 2a of a network slice 101 for eMBB users receives during step S-905 an M-MTC user attach from UE 1, and forwards during step S-910 a slice selection data request toward the SDR 4a, e.g. via the UDM-FE 3a, which in turn transmits during step S-915 the slice selection data request to the SDR 4a.

In this case, the SDR 4a, which is in charge of subscription information for eMBB users, may determine during step S-920 that the M-MTC user is not found. At this stage, different embodiments may apply, and are further discussed with reference to FIG. 10, FIG. 11 and FIG. 12.

For the time being and with reference to FIG. 9, it is enough to say that an entity of the eMBB network slice 101, such as e.g. the SDR 4a, the UDM-FE 3a or the AMF 2a, transmits during step S-950 the slice selection data request to the SSR 5 and the latter returns during step S-955 the slice selection data for the UE toward the requester entity of the eMBB network slice 101, so that the M-MTC user attach from UE 1 can be redirected during step S-960 toward another slice.

In particular, the slice selection data for a UE may include a slice identifier, e.g. slice ID, usable by the UE to attach to the correct network slice. Also in particular, the slice selection data obtained at the AMF 2a may be used by the SSF 11a to select a new network slice to redirect the UE, and the AMF 2a may trigger the redirection. Nevertheless, other possible contents of the slice selection data have been discussed above.

Upon receipt of the M-MTC user attach redirection during step S-960, an M-MTC user attach may be transmitted during step S-965 from the UE 1 toward the AMF 2b of a network slice 102 for M-MTC users. The AMF 2b then forwards during step S-970 a slice selection data request toward the SDR 4b, e.g. via the UDM-FE 3b, which in turn transmits during step S-975 the slice selection data request to the SDR 4b.

As commented above, the UDM-FE 3*b* may be included in the SDR 4*b* so that the AMF 2*b* can directly communicate with SDR 4*b* without the intermediary UDM-FE 3*b*.

In this case, the SDR 4*b*, which is in charge of subscription information for M-MTC users, may determine during step S-980 that the M-MTC user is found, and returns during step S-985 subscription information with slice selection data toward the AMF 2*b*, e.g. via the UDM-FE 3*b*, which in turn transmits during step S-990 the subscription information with the slice selection data to the AMF 2*b*.

Then, the AMF 2*b* transmits during step S-995 allowance of the attach request of the UE to this network slice 102. This allowance is based on the received subscription information for the UE.

As commented above, different embodiments are provided for to obtain slice selection data for a UE, at a network slice from an SSR, when subscription information for the UE is unknown at the network slice.

In this respect, FIG. 10 illustrates an embodiment where it is the FE, which has the application logic to access the SDR, the one interworking with the SSR; FIG. 11 illustrates an embodiment where it is the SDR itself the one interworking with the SSR; and FIG. 12 illustrates an embodiment where it is the AMF the one interworking with the SSR.

In the embodiment illustrated in FIG. 10, the AMF 2*a* of a network slice 101 for eMBB users receives during step S-1005 an M-MTC user attach from UE 1, and forwards during step S-1010 a slice selection data request toward the SDR 4*a*, e.g. via the UDM-FE 3*a*, which in turn transmits during step S-1015 the slice selection data request to the SDR 4*a*.

In this case, the SDR 4*a*, which is in charge of subscription information for eMBB users, may determine during step S-1020 that the M-MTC user is not found, and returns to the UDM-FE 3*a* during step S-1025 an unsuccessful result indicating no subscription information exists at the SDR for the UE, e.g. 'unknown subscription' for the UE 1.

Then, the UDM-FE 3*a* transmits during step S-1030 a slice selection data request to the SSR 5. The UDM-FE 3*a* receives during step S-1035 the slice selection data from the SSR 5, and transmits during step S-1040 the slice selection data to the AMF 2*a*.

The AMF 2*a*, likely with support of the SSF 11*a*, redirects during step S-1045 the M-MTC user attach toward another network slice.

In the embodiment illustrated in FIG. 11, the AMF 2*a* of a network slice 101 for eMBB users receives during step S-1105 an M-MTC user attach from UE 1, and forwards during step S-1110 a slice selection data request toward the SDR 4*a*, e.g. via the UDM-FE 3*a*, which in turn transmits during step S-1115 the slice selection data request to the SDR 4*a*.

In this case, the SDR 4*a*, which is in charge of subscription information for eMBB users, may determine during step S-1120 that the M-MTC user is not found, and transmits during step S-1125 a slice selection data request to the SSR 5. The SDR 4*a* receives during step S-1130 the slice selection data from the SSR 5, and transmits during step S-1135 the slice selection data toward the AMF 2*a*, e.g. via the UDM-FE 3*a*, which in turn transmits during step S-1140 the slice selection data to the AMF 2*a*.

The AMF 2*a*, likely with support of the SSF 11*a*, redirects during step S-1145 the M-MTC user attach toward another network slice.

In the embodiment illustrated in FIG. 12, the AMF 2*a* of a network slice 101 for eMBB users receives during step S-1205 an M-MTC user attach from UE 1, and forwards during step S-1210 a slice selection data request toward the SDR 4*a*, e.g. via the UDM-FE 3*a*, which in turn transmits during step S-1215 the slice selection data request to the SDR 4*a*.

In this case, the SDR 4*a*, which is in charge of subscription information for eMBB users, may determine during step S-1220 that the M-MTC user is not found, and returns to the UDM-FE 3*a* during step S-1225 an unsuccessful result indicating no subscription information exists at the SDR for the UE, e.g. 'unknown subscription' for the UE 1.

Then, the UDM-FE 3*a* transmits during step S-1230 to the AMF 2*a* the received unsuccessful result indicating no subscription information exists at the SDR for the UE, e.g. 'unknown subscription' for the UE 1.

Once aware of the unknown subscription, the AMF 2*a* transmits during step S-1235 a slice selection data request to the SSR 5, and receives during step S-1240 the slice selection data from the SSR 5.

The AMF 2*a*, likely with support of the SSF 11*a*, redirects during step S-1245 the M-MTC user attach toward another network slice.

On the other hand, the embodiments above where the SSR 5 is involved may be used for roaming scenarios, like the one illustrated in FIG. 15. That is, when users are roaming outside a home PLMN (HPLMN) there is a need to find a UDM system, a network slice or the like, holding subscription information for the user.

To this end, a subscriber location function (SLF) has been defined as a network function. However, rather than provisioning the SLF with addresses of UDM systems, network slices or the like, an embodiment like the one illustrated in e.g. FIG. 7 may be used for this purpose.

For example, if an M-MTC user roams in VPLMN #1, any access to a user's SDR requires a sort of "discovery" of which is the right SDR within the HPLMN to contact to.

As FIG. 15 illustrates, an access request transmitted from an AMF in the VPLMN #1 is received during step S-1505 at the HPLMN via a Diameter Edge Agent (DEA) entity 12, which is deployed by the HPLMN operator at the edge of the network in order to collect incoming Diameter-related traffic. The DEA 12 transmits during step S-1510 this request toward an SLF node 13, as this is the entity in charge of performing the "discovery" of the right SDR within the HPLMN.

The "discovery" actually means the determination of an identifier or address of an UDM system, network slice or the like, where the access request from VPLMN #1 may be directed to. To this end, the SLF node 13 transmits during step S-1515, to the SSR 5, a request for retrieval of the identifier or address of the UDM system, network slice or the like, corresponding to the user whose identity is included within the request.

Upon receipt of the requested identifier or address at the SLF node 13, which in this exemplary case corresponds to an identifier or address of the network slice #2 102, the SLF node 13 may properly transmit during step S-1520 the access request to a Diameter Routing Agent (DRA) node 14*b*, or the like, in the network slice 102 from where the SDR in this network slice can be consulted.

Aligned with the embodiments commented above, embodiments of a method respectively carried out by an SDR and by an SSR, for selecting a network slice to serve a UE in a network that comprises a plurality of network slices, are further disclosed with reference to FIG. 16 and FIG. 17.

FIG. 16 illustrates an embodiment of a method for selecting a network slice to serve a UE in a network that comprises a plurality of network slices, this method applies at an exemplary SDR 4a, which participates in the method per network slice basis.

This method comprises a step S-1610 of holding subscription information for each UE to be served by the exemplary network slice 101, wherein the subscription information comprises slice selection data for the UE; a step S-1620 of receiving, from an entity of the network slice 101 such as an AMF 2a or UDM-FE 3a may be, a request for slice selection data for a UE; and a step S-1630 of transmitting, toward the entity of the network slice, the subscription information with the slice selection data for the UE.

FIG. 17 illustrates an embodiment of a method for selecting a network slice to serve a UE in a network that comprises a plurality of network slices, this method applies at an SSR 5, which participates in the method per network basis, is external to any network slice and shared by the plurality of network slices.

This method comprises a step S-1710 of holding slice selection data for every UE in the network, wherein the UE is to be served only by a network slice holding subscription information for the UE; a step S-1720 of receiving, from an entity of an exemplary network slice 101 such as an AMF 2a, a UDM-FE 3a or an SDR 4a may be, a request for slice selection data for a UE; and a step S-1730 of transmitting, to the entity of the network slice, the slice selection data for the UE.

The apparatuses, contributing to methods for selecting a network slice to serve a UE in a network that comprises a plurality of network slices, are described in the following with reference to specific embodiments of such apparatuses, i.e. an SDR and an SSR, as respectively illustrated in FIG. 13 and FIG. 14, in one embodiment, and as respectively illustrated in FIG. 18 and FIG. 19, in another embodiment.

In particular, a distributed slice data repository is provided for handling slice selection data for users equipped with a UE, in a network that comprises a plurality of network slices. This distributed slice data repository comprises an SDR, e.g. SDR 4a and SDR 4b, per network slice basis, and an SSR 5, which is external to any network slice, e.g. 101 and 102, and shared by the plurality of network slices.

In accordance with an embodiment illustrated on FIG. 13, the SDR 4a or 4b may comprise at least one processor 420, and at least one memory 410 that stores processor-executable instructions 414. In this SDR, the at least one processor interfaces with the at least one memory to execute the processor-executable instructions, whereby the SDR is operable to perform the actions disclosed in the following.

The SDR 4a or 4b is thus operable to hold subscription information for each UE to be served by the network slice, wherein the subscription information comprises slice selection data for the UE.

This SDR 4a or 4b is also operable to receive, via a receiver 430 from an entity 2a or 3a of the network slice, a request for slice selection data for a UE and transmit, via a transmitter 440 toward the entity 2a or 3a of the network slice, the subscription information with the slice selection data for the UE.

In an embodiment, the entity of the network slice may be any one of an AMF 2a of the exemplary network slice 101, and an FE 3a, which connects in the network slice 101 the AMF 2a and the SDR 4a, and is equipped with application logic to access the SDR. The same embodiment may be provided for the exemplary network slide 102 involving the AMF 2b, the FE 3b and the SDR 4b.

Regarding the case wherein the subscription information for a UE is not held and available at the SDR, in an embodiment, the SDR may further be operable to transmit, via the transmitter 440 toward the entity 2a or 3a of the exemplary network slice 110, an unsuccessful result indicating no subscription information exists at the SDR for the UE, e.g. 'unknown subscription' for the UE.

In another embodiment for the case wherein the subscription information for a UE is not held and available at the SDR, the SDR may further be operable to transmit a request for slice selection data for the UE, via the transmitter 440 toward an SSR 5, which is external to any network slice e.g. 101 and 102 and shared by the plurality of network slices, receive the slice selection data, from the SSR 5 via the receiver 430, and forward the received slice selection data, via the transmitter 440 toward the entity 2a or 3a of the network slice.

In particular, a subscription handler 424 running in a processor 420 may hold the subscription information for each UE to be served by the network slice, wherein the subscription information comprises slice selection data for the UE, may receive via the receiver 430 the request for slice selection data for the UE, and may transmit via the transmitter 440 toward the entity 2a or 3a of the network slice the subscription information with the slice selection data for the UE.

In an embodiment, in case the subscription handler 424 determines, upon receiving a request for slice selection data for a UE, that subscription information is not held for a UE, a slice selection data handler 427 running in a processor 420 may transmit the request for slice selection data for the UE, via the transmitter 440 toward an SSR 5, receive the slice selection data, from the SSR 5 via the receiver 430, and forward the received slice selection data, via the transmitter 440 toward the entity 2a or 3a of the network slice. In another embodiment for this case, the subscription handler 424 may transmit, via the transmitter 440 toward the entity 2a or 3a of the network slice 110, an unsuccessful result indicating no subscription information exists at the SDR for the UE, e.g. 'unknown subscription' for the UE.

In an embodiment, the SDR 4a (or 4b mutatis mutandis) may be external to the network slice, the SSR 5 may comprise the SDR and, in this embodiment, the entity of the network slice is the FE 3a, which connects in the network slice the AMF 2a and the SDR 4a, and is equipped with application logic to access the SDR.

In another embodiment, the SDR 4a is an entity of the exemplary network slice 101 and is not shared with other exemplary network slices 102.

Generally speaking, the FE 3a or 3b may be any one of a user data management front-end or unified data management front-end (UDM-FE), a home subscriber server front-end (HSS-FE) and Subscriber Data Management function front-end (SDM-FE).

If required at all, the SDR 4a or 4b may be complemented with a data section 418 in memory to store the subscription information for each UE to be served by the network slice, wherein the subscription information comprises slice selection data for the UE.

The SDR 4a or 4b illustrated in FIG. 13 may thus comprise the at least one processor 420 and the at least one memory 410, both in communication with each other, with the subscription handler 424, the slice selection data handler 427, the receiver 430 and the transmitter 440, and with other elements or units of the SDR 4a or 4b. The at least one memory 410 may comprise volatile and/or non-volatile memory. In particular, the at least one memory 410 may have a computer program 414 and data 418 stored therein. The computer program 414 may be loaded in the at least one memory 410 from a computer program product 450, such as any non-transitory computer readable medium, in which the computer program is stored. The data 418 may comprise subscription information for each UE to be served by the network slice, wherein the subscription information comprises slice selection data for the UE. The at least one processor 420 may be configured to carry out the functions of the subscription handler 424 and the slice selection data handler 427.

In accordance with an embodiment illustrated on FIG. 14, the SSR 5 may comprise at least one processor 520, and at least one memory 510 that stores processor-executable instructions 514. In this SSR, the at least one processor interfaces with the at least one memory to execute the processor-executable instructions, whereby the SSR is operable to perform the actions disclosed in the following.

The SSR 5 is thus operable to hold slice selection data for every UE in the network, wherein the UE is to be served only by a network slice holding subscription information for the UE, receive, via a receiver 530 from an entity 2a, 3a or 4a of a network slice, a request for slice selection data for a UE, and transmit, via a transmitter 540 to the entity of the network slice, the slice selection data for the UE.

In particular, a slice selection data handler 526 running in a processor 520 may hold the slice selection data for every UE in the network, wherein the UE is to be served only by a network slice holding subscription information for the UE. The slice selection data handler 526 may also receive, via a receiver 530 from an entity 2a, 3a or 4a of a network slice, a request for slice selection data for a UE, and may transmit, via a transmitter 540 to the entity of the network slice, the slice selection data for the UE.

In an embodiment, the entity of the network slice may be any one of an AMF 2a of the exemplary network slice 101, and an FE 3a, which connects in the network slice 101 the AMF 2a and the SDR 4a, and is equipped with application logic to access the SDR. In this embodiment, the SDR 4a may be external to the network slice, and the SSR 5 may comprise the SDR 4a. The same embodiment may be provided for the exemplary network slide 102 involving the AMF 2b, the FE 3b and the SDR 4b.

In another embodiment, the entity of the network slice may be any one of an AMF 2a of the exemplary network slice 101, an SDR 4a and an FE 3a, which connects in the network slice 101 the AMF 2a and the SDR 4a, and is equipped with application logic to access the SDR. In this another embodiment, the SDR 4a may be an entity of the network slice and not shared with other network slices. The same embodiment may be provided for the exemplary network slide 102 involving the AMF 2b, the FE 3b and the SDR 4b.

If required at all, the SSR 5 may be complemented with a data section 518 in memory to store the slice selection data for every UE in the network.

The SSR 5 illustrated in FIG. 14 may thus comprise the at least one processor 520 and the at least one memory 510, both in communication with each other, with the slice selection data handler 526, the receiver 530 and the transmitter 540, and with other elements or units of the SSR 5. The at least one memory 510 may comprise volatile and/or non-volatile memory. In particular, the at least one memory 510 may have a computer program 514 and data 518 stored therein. The computer program 514 may be loaded in the at least one memory 510 from a computer program product 550, such as any non-transitory computer readable medium, in which the computer program is stored. The data 518 may comprise slice selection data for every UE in the network.

The at least one processor 520 may be configured to carry out the functions of the slice selection data handler 526.

In accordance with another embodiment illustrated on FIG. 18, the SDR 4a or 4b may comprise a subscription handler 424 configured to hold the subscription information for each UE to be served by the network slice, wherein the subscription information comprises slice selection data for the UE. This SDR 4a or 4b comprises a receiver 430 configured to receive, from an entity of the network slice, a request for slice selection data for a UE, and a transmitter 440 configured to transmit, to the entity of the network slice, the subscription information with the slice selection data for the UE.

This subscription handler 424 may also be configured to determine, upon receiving via the receiver 430 the request for slice selection data for the UE, that subscription information is not held for a UE. In an embodiment for this case, the SDR 4a or 4b may comprise a slice selection data handler 427 configured to transmit, via the transmitter 440 toward an SSR 5 the request for slice selection data for the UE, receive the slice selection data, from the SSR 5 via the receiver 430, and forward the received slice selection data, via the transmitter 440 toward the entity 2a or 3a of the network slice.

In another embodiment for this case in which subscription information is not held for a UE, instead of including the slice selection data handler 427 in the SDR 4a or 4b, the subscription handler 424 may be configured to transmit, via the transmitter 440 toward the entity 2a or 3a of the network slice, an unsuccessful result indicating no subscription information exists at the SDR for the UE, e.g. 'unknown subscription' for the UE.

In accordance with another embodiment illustrated on FIG. 19, the SSR 5 may comprise a slice selection data handler 526 configured to hold slice selection data for every UE in the network, wherein the UE is to be served only by a network slice holding subscription information for the UE. This SSR 5 comprises a receiver 530 configured to receive, from an entity of a network slice, a request for slice selection data for a UE, and a transmitter 540 configured to transmit, to the entity of the network slice, the slice selection data for the UE.

The slice selection data handler 526 may also be configured to receive, via the receiver 530 from the entity of the network slice, the request for slice selection data for a UE, and transmit, via the transmitter 540 to the entity of the network slice, the slice selection data for the UE.

The invention may also be practiced by a one or more computer program, each computer program comprising instructions which, when executed on at least one processor, cause the at least one processor to carry out at least one of the methods discussed above.

The invention is described above in connection with various embodiments that are intended to be illustrative and non-restrictive. It is expected that those of ordinary skill in this art may modify these embodiments. The scope of the invention is defined by the claims in conjunction with the description and drawings, and all modifications that fall within the scope of the claims are intended to be included therein.

The invention claimed is:

1. A method for selecting a network slice to serve a user equipment (UE) in a network that comprises a plurality of network slices, the method comprising:
receiving, at an access and mobility management function (AMF) of the network slice, an attach request originated from the UE;

forwarding, from the AMF toward a slice user data repository (SDR), a request for slice selection data;

determining, at the SDR, if subscription information is available at the SDR for the UE being served in the network slice;

if the subscription information is available, forwarding, from the SDR toward the AMF, the subscription information with the slice selection data for the UE, and transmitting, from the AMF toward the UE, allowance of the attach request of the UE to the network slice, the allowance being based on the received subscription information; and if the subscription information is not available, receiving the slice selection data for the UE at the AMF, the slice selection data being obtained from a slice selection repository (SSR) which is external to the network slice and shared by the plurality of network slices, and redirecting, from the AMF, the attach request of the UE toward a different network slice based on the received slice selection data for the UE.

2. The method of claim 1, wherein forwarding the request for the slice selection data from the AMF toward the SDR comprises transmitting the request through a front-end (FE) which connects the AMF and the SDR in the network slice, and wherein the FE is equipped with an application logic to access the SDR.

3. The method of claim 2, further comprising, in order to obtain the slice selection data from the SSR, transmitting the request for the slice selection data, from the FE toward the SSR, and receiving the slice selection data at the FE from the SSR.

4. The method of claim 2, wherein receiving the subscription information with the slice selection data at the AMF comprises receiving the subscription information with the slice selection data from the FE, which connects the AMF and the SDR in the network slice.

5. The method of claim 1, further comprising, in order to obtain the slice selection data from the SSR, transmitting the request for the slice selection data, from any one of the SDR and the AMF toward the SSR, and receiving the slice selection data, at the any one of the SDR and the AMF from the SSR.

6. A distributed slice data repository for handling slice selection data for users equipped with a user equipment (UE) in a network that comprises a plurality of network slices, the distributed slice data repository comprising:

a slice user data repository (SDR), per network slice basis, each SDR being configured to:

hold subscription information for each UE to be served by a network slice, wherein the subscription information comprises slice selection data for the UE, and wherein the slice selection data comprises a slice service type (SST) for each network slice allowed for a user;

receive, from an entity of the network slice, a request for slice selection data for the UE; and transmit, to the entity of the network slice the subscription information with the slice selection data for the UE; and a slice selection repository (SSR) which is external to any network slice and shared by the plurality of network slices, the SSR being configured to:

hold slice selection data for every UE in the network, wherein the UE is to be served only by a network slice holding the subscription information for the UE;

receive, from an entity of a network slice, a request for slice selection data for the UE; and transmit, to the entity of the network slice, the slice selection data for the UE.

7. The distributed slice data repository of claim 6, wherein the SDR is further configured to receive the request for the slice selection data for the UE from one of an access and mobility management function (AMF) of the network slice, and a front-end (FE) which connects the AMF and the SDR in the network slice, and wherein the FE is equipped with an application logic to access the SDR.

8. The distributed slice data repository of claim 7, wherein the SSR is configured to receive the request for the slice selection data, from any one of the SDR, the FE, and the AMF of the network slice, and transmit the slice selection data, toward the any one of the SDR, the FE, and the AMF.

9. The distributed slice data repository of claim 6, wherein the slice selection data further comprises at least one of: UE usage type, a network slice selection assistance information (NSSAI), and a session management NSSAI (SM-NSSAI), for each network slice allowed for the user.

10. A slice user data repository (SDR) participating on per network slice basis in a distributed slice data repository for handling slice selection data for users equipped with a user equipment (UE) in a network that comprises a plurality of network slices, the SDR configured to:

hold subscription information for each UE to be served by the network slice, the subscription information comprising slice selection data for the UE;

receive, via a receiver from an entity of the network slice, a request for slice selection data for the UE; and transmit, via a transmitter toward the entity of the network slice, the subscription information with the slice selection data for the UE; and if the subscription information for the UE is not held and available, the SDR is further configured to:

transmit the request for the slice selection data for the UE, via the transmitter toward a slice selection repository (SSR) which is external to any network slice and shared by the plurality of network slices;

receive the slice selection data, from the SSR via the receiver; and forward the received slice selection data, via the transmitter toward the entity of the network slice.

11. The SDR of claim 10, wherein the entity of the network slice is any one of an access and mobility management function (AMF) of the network slice, and a front-end (FE) which connects the AMF and the SDR in the network slice, and wherein the FE is equipped with an application logic to access the SDR.

12. The SDR of claim 11, wherein the FE is any one of a unified data management front-end (UDM-FE), a Subscriber Data Management front-end (SDM-FE), and a home subscriber server front-end (HSS-FE).

13. The SDR of claim 10, wherein if the subscription information for the UE is not held and available, the SDR is further configured to transmit, via the transmitter toward the entity of the network slice, an unsuccessful result indicating that no subscription information exists at the SDR for the UE.

14. The SDR of claim 10, wherein the entity of the network slice is a front-end (FE) which connects the AMF and the SDR in the network slice, wherein the FE is equipped with an application logic to access the SDR, and wherein the SDR is external to the network slice, and wherein the SSR comprises the SDR.

15. The SDR of claim 10, wherein the SDR is the entity of the network slice and is not shared with other network slices.

16. A method for selecting a network slice to serve a user equipment (UE) in a network that comprises a plurality of network slices, the method applying at a slice user data repository (SDR) participating in the method per network slice basis, and the method comprising:
holding subscription information for each UE to be served by the network slice, the subscription information comprising slice selection data for the UE;
receiving, from an entity of the network slice, a request for slice selection data for the UE; and
transmitting, toward the entity of the network slice, the subscription information with the slice selection data for the UE; and
if the subscription information for the UE is not held and available, the method further comprises:
transmitting the request for slice selection data for the UE toward a slice selection repository (SSR) which is external to any network slice and shared by the plurality of network slices;
receiving the slice selection data from the SSR; and
forwarding the received slice selection data toward the entity of the network slice.

17. The method of claim 16, wherein the entity of the network slice is any one of an access and mobility management function (AMF) of the network slice, and a front-end (FE) which connects the AMF and the SDR in the network slice, and wherein the FE is equipped with an application logic to access the SDR.

18. The method of claim 17, wherein the FE is any one of a unified data management front-end (UDM-FE), a Subscriber Data Management front-end (SDM-FE), and a home subscriber server front-end (HSS-FE).

19. The method of claim 16, wherein if the subscription information for the UE is not held and available, the method further comprises transmitting, toward the entity of the network slice, an unsuccessful result indicating no subscription information exists at the SDR for the UE.

20. The method of claim 16, wherein the entity of the network slice is a front-end (FE) which connects the AMF and the SDR, wherein the FE is equipped with an application logic to access the SDR, and wherein the SDR is external to the network slice, and wherein the SSR comprises the SDR.

21. The method of claim 16, wherein the SDR is the entity of the network slice and is not shared with other network slices.

* * * * *